United States Patent
Damnjanovic et al.

(10) Patent No.: US 8,885,479 B2
(45) Date of Patent: Nov. 11, 2014

(54) MULTICARRIER RETRANSMISSION FEEDBACK

(75) Inventors: Jelena M. Damnjanovic, Del Mar, CA (US); Wanshi Chen, San Diego, CA (US); Peter Gaal, San Diego, CA (US); Juan Montojo, Nuremberg (DE); Naga Bhushan, San Diego, CA (US); Aamod Dinkar Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 753 days.

(21) Appl. No.: 12/774,671

(22) Filed: May 5, 2010

(65) Prior Publication Data

US 2011/0116457 A1 May 19, 2011

Related U.S. Application Data

(60) Provisional application No. 61/176,470, filed on May 7, 2009.

(51) Int. Cl.
*H04L 1/00* (2006.01)
*H04L 1/18* (2006.01)
*H04L 5/00* (2006.01)
*H04W 72/12* (2009.01)

(52) U.S. Cl.
CPC ............ *H04L 1/1854* (2013.01); *H04L 5/0042* (2013.01); *H04W 72/1289* (2013.01); *Y02B 60/50* (2013.01); *H04L 1/1861* (2013.01)
USPC ............................ 370/236; 370/242; 370/252

(58) Field of Classification Search
USPC .................. 370/216, 236, 242, 252, 328, 394
See application file for complete search history.

(56) References Cited

U.S. PATENT DOCUMENTS

| | | | |
|---|---|---|---|
| 7,940,687 B2 | 5/2011 | Sampath | |
| 2008/0095109 A1 | 4/2008 | Malladi et al. | |
| 2009/0241004 A1* | 9/2009 | Ahn et al. | 714/749 |
| 2010/0165939 A1* | 7/2010 | Lin | 370/329 |
| 2011/0096693 A1* | 4/2011 | Astely et al. | 370/252 |
| 2011/0176443 A1* | 7/2011 | Astely et al. | 370/252 |

FOREIGN PATENT DOCUMENTS

| | | |
|---|---|---|
| EP | 2200208 A1 | 6/2010 |
| EP | 2204937 A1 | 7/2010 |
| JP | 2010530709 A | 9/2010 |
| JP | 2012512582 A | 5/2012 |

(Continued)

OTHER PUBLICATIONS

3GPP TS 36.213 v8.5.0 (Dec. 2008) 3rd Generation Partnership Project; Technical Specification Group Radio Access Network; Evolved Universal Terrestrial Radio Access (E-UTRA); Physical layer procedures (Release 8), 3rd Generation Partnership Project (3GPP); Technical Specification (TS), XX, XX, [Online] vol. 36.213, No. TS 36.213 V8.5.0, Dec. 1, 2008, pp. 1-16, XP002572343, section 7.3.

(Continued)

*Primary Examiner* — Kwang B Yao
*Assistant Examiner* — Nguyen Ngo

(57) ABSTRACT

Systems and methodologies are described that facilitate indicating feedback parameters for multiple single carrier assignments, multicarrier assignments, and/or the like according to single carrier-frequency division multiple access (SC-FDMA), relaxed SC-FDMA, etc. Feedback in relaxed SC-FDMA can be bundled by a mobile device to conserve power. In addition, a downlink assignment indicator (DAI) can be utilized to detect and indicate lost grants.

28 Claims, 16 Drawing Sheets

(56) References Cited

FOREIGN PATENT DOCUMENTS

| RU | 2007114300 A | 10/2008 |
|---|---|---|
| WO | WO-2008156414 A2 | 12/2008 |
| WO | WO2009044367 A2 | 4/2009 |
| WO | 2010069422 A1 | 6/2010 |

OTHER PUBLICATIONS

International Search Report and Written Opinion—PCT/US2010/033932, International Search Authority—European Patent Office—Dec. 20, 2010.
Motorola et al.: "ACK/NACK Bundling for TDD: Way Forward", R1-082168, May 14, 2008, XP002613007.
Nokia et al: 3GPP Draft; R1-082615, "DAI Design for TDD configuration #5 (9:1) in ACN/NACK Bundling" 3rd Generation Partnership Project (3GPP), Mobile Competence Centre; 650, Route Des Lucioles; F-06921 Sophia-Antipolis Cedex; France, vol. RAN WG1, No. Warsaw, Poland; Jun. 26, 2008, XP050110867, section "Options for the DAI field".
Panasonic: "UL ACK/NACK transmission on PUCCH for carrier aggregation", 3GPP Draft; R1-091170, 3rd Generation Partnership Project (3GPP), Mobile Competence Centre; 650, Route Des Lucioles; F-06921 Sophia-Antipolis Cedex; France, No. Seoul, Korea; Mar. 17, 2009, XP050338790.
Samsung: "DAI transmission for LTA-A TDD", 3GPP Draft; R1-100099, 3rd Generation Partnership Project (3GPP), Mobi le Competence Centre ; 650, Route Des Lucioles ; F-06921 Sophia-Antipolis Cedex ; France, vol. RAN WG1, No. Valencia, Spain; Jan. 18, 2010, Jan. 12, 2010, XP050417834.
ZTE: "Uplink Control Channel Design for LTE-Advanced", 3GPP Draft; R1-091427 Uplink Control Channel Design for LTE-A, 3rd Generation Partnership Project (3GPP), Mobile Competence Centre; 650, Route Des Lucioles; F-06921 Sophia-Antipolis Cedex; France, No. Seoul, Korea; Mar. 17, 2009, XP050339006.
Nokia et al., "L1 control signaling with carrier aggregation in LTE-Advanced", 3GPP Draft; R1-083730, 3rd Generation Partnership Project (3GPP), Mobile Competence Centre ; 650, Route Des Lucioles ; F-06921 Sophia-Antipolis Cedex ; France, No. Prague, Czech Republic; Sep. 24, 2008, XP050317069.
Samsung, Catt, "4 Bits ACK/NACK Generation in TDD Configuration 5", 3GPP TSG RAN WG1 Meeting #54 R1-082861, 3GPP, Aug. 22, 2008.
Taiwan Search Report—TW099114712—TIPO—Sep. 4, 2013.
Texas Instruments, "On remaining issues of TDD ACK/NAK transmission on PUSCH", 3GPP TSG RAN WG1 #54 bis R1-083525, 3GPP, Oct. 3, 2008.
Panasonic: "UL ACK/NACK transmission on PUCCH for carrier aggregation", 3GPP TSG-RAN WG1 Meeting #57, R1-091744, May 4-8, 2009, pp. 1-3.

* cited by examiner

MULTICARRIER RETRANSMISSION FEEDBACK

CROSS-REFERENCE

This application claims the benefit of U.S. Provisional Application Ser. No. 61/176,470, filed May 7, 2009, and entitled "MULTICARRIER UL HARQ FEEDBACK DESIGN," the entirety of which is incorporated herein by reference.

BACKGROUND

I. Field

The present disclosure relates generally to wireless communications and more specifically to communicating feedback relating to retransmission.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc.

Generally, wireless multiple-access communication systems may simultaneously support communication for multiple mobile devices. Each mobile device may communicate with one or more access points (e.g., base stations, femtocells, picocells, relay nodes, and/or the like) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

In addition, access points can assign resources to mobile devices for communicating therewith over the uplink and/or downlink connection. In one example, access points can assign downlink resources related to a carrier for transmitting to the mobile devices. The mobile devices can provide feedback regarding receiving transmissions over the resources. The feedback can relate to a retransmission technology, such as automatic repeat/request (ARQ), hybrid ARQ (HARQ), etc., in one example. In another example, access points can provide multicarrier resource assignments to one or more mobile devices (e.g., to improve communication throughput). In this example, the mobile device can communicate feedback to the access points regarding each carrier in the multicarrier resource assignment.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

In accordance with one or more embodiments and corresponding disclosure thereof, various aspects are described in connection with facilitating communicating feedback associated with multicarrier resource assignments. In one example, resources for feedback can be mapped for carriers in the multicarrier resource assignments using one or more mapping schemes. Some mapping schemes, however, can cause ambiguity in whether a downlink resource assignment is received. In single carrier-frequency division multiple access (SC-FDMA), for example, a downlink assignment index (DAI) can be leveraged to facilitate detecting missing downlink resource grants. Moreover, in relaxed SC-FDMA, for example, feedback for multiple carriers can be bundled to meet power requirements on a related device. Similarly, in this example, DAI can be utilized for detecting lost downlink resource grants.

According to related aspects, a method is provided that includes receiving a plurality of downlink resource grants related to a plurality of carriers for data transmission and obtaining a DAI related to each of the plurality of downlink resource grants. The method further includes determining one or more lost downlink resource grants based at least in part on the DAI related to each of the plurality of downlink resource grants.

Another aspect relates to a wireless communications apparatus. The wireless communications apparatus can include at least one processor configured to obtain a plurality of downlink resource grants related to a plurality of carriers and determine a DAI related to at least one of the plurality of downlink resource grants. The at least one processor is further configured to detect one or more lost downlink resource grants based at least in part on the DAI. The wireless communications apparatus also comprises a memory coupled to the at least one processor.

Yet another aspect relates to an apparatus. The apparatus includes means for receiving a plurality of downlink resource grants related to a plurality of carriers for data transmission. The apparatus also includes means for detecting one or more lost downlink resource grants based at least in part on a DAI for at least one of the plurality of downlink resource grants.

Still another aspect relates to a computer program product, which can have a computer-readable medium including code for causing at least one computer to obtain a plurality of downlink resource grants related to a plurality of carriers and code for causing the at least one computer to determine a DAI related to at least one of the plurality of downlink resource grants. The computer-readable medium can also comprise code for causing the at least one computer to detect one or more lost downlink resource grants based at least in part on the DAI.

Moreover, an additional aspect relates to an apparatus including a downlink grant receiving component that obtains a plurality of downlink resource grants related to a plurality of carriers for data transmission. The apparatus can further include a lost grant determining component that detects one or more lost downlink resource grants based at least in part on a DAI for at least one of the plurality of downlink resource grants.

According to another aspect, a method is provided that includes receiving a plurality of downlink resource grants related to a plurality of carriers for data transmission and determining a format for providing a plurality of feedback parameters related to the plurality of downlink resource grants based at least in part on a power requirement. The method further includes transmitting one or more of the plurality of feedback parameters based at least in part on the format.

Another aspect relates to a wireless communications apparatus. The wireless communications apparatus can include at least one processor configured to obtain a plurality of downlink resource grants related to a plurality of carriers for data transmission and select a format for providing a plurality of feedback parameters related to the plurality of downlink resource grants based at least in part on a power requirement. The at least one processor is further configured to transmit one or more of the plurality of feedback parameters for the plurality of downlink resource grants based at least in part on the format. The wireless communications apparatus also comprises a memory coupled to the at least one processor.

Yet another aspect relates to an apparatus. The apparatus includes means for receiving a plurality of downlink resource grants related to a plurality of carriers for data transmission and means for determining a format for providing a plurality of feedback parameters related to the plurality of downlink resource grants based at least in part on a power requirement. The apparatus also includes means for transmitting one or more of the plurality of feedback parameters based at least in part on the format.

Still another aspect relates to a computer program product, which can have a computer-readable medium including code for causing at least one computer to obtain a plurality of downlink resource grants related to a plurality of carriers for data transmission and code for causing the at least one computer to select a format for providing a plurality of feedback parameters related to the plurality of downlink resource grants based at least in part on a power requirement. The computer-readable medium can also comprise code for causing the at least one computer to transmit one or more of the plurality of feedback parameters for the plurality of downlink resource grants based at least in part on the format.

Moreover, an additional aspect relates to an apparatus including a downlink grant receiving component that obtains a plurality of downlink resource grants related to a plurality of carriers for data transmission and a hybrid automatic repeat/request (HARQ) format selecting component that determines a format for providing a plurality of feedback parameters related to the plurality of downlink resource grants based at least in part on a power requirement. The apparatus can further include a HARQ indicating component that transmits one or more of the plurality of feedback parameters based at least in part on the format.

According to yet another aspect, a method is provided that includes generating a plurality of downlink resource grants for a device to facilitate communicating therewith. The method also includes indicating a sequence number of at least one of the plurality of downlink resource grants or a total number of the plurality of downlink resource grants by utilizing a DAI of at least one of the plurality of downlink resource grants and transmitting the plurality of downlink resource grants to the device.

Another aspect relates to a wireless communications apparatus. The wireless communications apparatus can include at least one processor configured to create a plurality of downlink resource grants for a device to facilitate communicating therewith over a plurality of carriers and specify a sequence number of at least one of the plurality of downlink resource grants or a total number of the plurality of downlink resource grants in a DAI of each of the plurality of downlink resource grants. The at least one processor is further configured to communicate the plurality of downlink resource grants to the device. The wireless communications apparatus also comprises a memory coupled to the at least one processor.

Yet another aspect relates to an apparatus. The apparatus includes means for generating a plurality of downlink resource grants for a device to facilitate communicating therewith. The apparatus also includes means for indicating a sequence number of at least one of the plurality of downlink resource grants or a total number of the plurality of downlink resource grants in a DAI of each of the plurality of downlink resource grants and means for transmitting the plurality of downlink resource grants to the device.

Still another aspect relates to a computer program product, which can have a computer-readable medium including code for causing at least one computer to create a plurality of downlink resource grants for a device to facilitate communicating therewith over a plurality of carriers and code for causing the at least one computer to specify a sequence number of at least one of the plurality of downlink resource grants or a total number of the plurality of downlink resource grants in a DAI of each of the plurality of downlink resource grants. The computer-readable medium can also comprise code for causing the at least one computer to communicate the plurality of downlink resource grants to the device.

Moreover, an additional aspect relates to an apparatus including a downlink grant creating component that generates a plurality of downlink resource grants for a device to facilitate communicating therewith and a grant parameter specifying component that indicates a sequence number of at least one of the plurality of downlink resource grants or a total number of the plurality of downlink resource grants in a DAI of each of the plurality of downlink resource grants. The apparatus can further include a communicating component that transmits the plurality of downlink resource grants to the device.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed, and the described embodiments are intended to include all such aspects and their equivalents.

DETAILED DESCRIPTION

Figure 1:
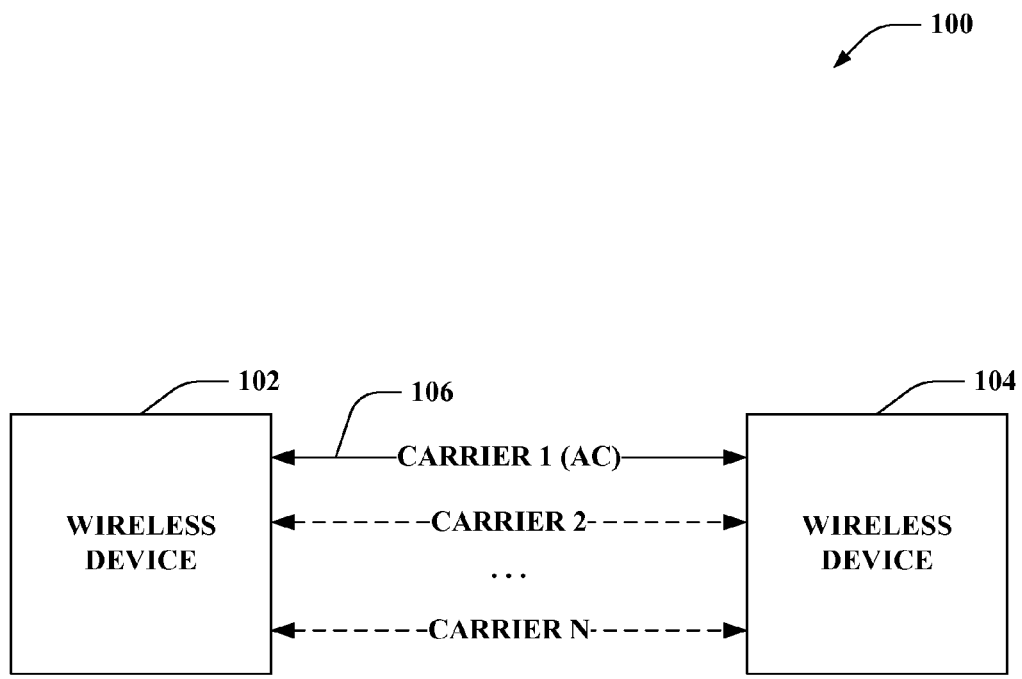
FIG. 1 is a block diagram of a system for assigning multiple carriers for communications between devices.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates an example wireless communication system 100 that facilitates assigning multiple carriers to devices for communicating therewith. System 100 includes wireless devices 102 and 104 that communicate in a wireless network. Wireless devices 102 and 104 can each be a mobile device, such as a UE, modem or other tethered device, and/or a portion thereof, an access point, such as a macrocell access point, femtocell or picocell access point, eNB, mobile base station, and/or a portion thereof, and/or substantially any device that communicates with and/or assigns/receives communication resources to/from another device.

For example, wireless devices 102 and 104 can communicate over one or more carriers. In an example, wireless device 104 can assign one or more carriers to wireless device 102 for communicating therewith. As depicted, wireless device 104 can provide wireless device 102 with a multicarrier assignment comprising N carriers, where N is a positive integer. Additionally, in an example, wireless device 104 can assign carrier 1 106 to wireless device 102, which can be an anchor carrier over which additional carrier assignments are provided to wireless device 102. In an example, the multiple carriers can be received in a single assignment from wireless device 104; additionally or alternatively, the multiple carriers can be assigned in multiple single carrier assignments. Moreover, it is to be appreciated that the carrier assignments can be per subframe, such that wireless device 104 can assign disparate carriers to wireless device 102 in disparate subframes. In this example, a subframe can refer to a portion of time that includes a set of defined frequency resources; the subframe can be a portion of a larger frame that utilizes substantially similar frequency resources over a greater period of time. As defined in 3GPP LTE and similar standards, a subframe can comprise a number of orthogonal frequency division multiplexing (OFDM) symbols that represent further divisions of the frequency resources over time. In any case, wireless device 102 can communicate feedback regarding each carrier to wireless device 104.

Feedback regarding the carriers, for example, can include feedback related to one or more retransmission schemes, such as automatic repeat/request (ARQ), hybrid ARQ (HARQ), and/or the like. In SC-FDMA, for example, wireless device 102 can communicate feedback for each of the carriers over uplink communication resources based at least in part on utilizing a cyclic shift and/or orthogonal sequence spreading to convey the feedback. In relaxed SC-FDMA, for example, wireless device 102 can communicate the feedback over dedicated resources selected based at least in part on the first control channel element (CCE) location of the respective downlink resources grant related to multiple single carrier assignments. For a single multicarrier assignment in relaxed SC-FDMA, wireless device 102 can communicate feedback over dedicated resources assigned based at least in part on the first N CCEs starting from the first CCE location of the respective downlink grant, where N can be a positive integer related to the number of carriers in the single multicarrier assignment.

In SC-FDMA, for example, ambiguity can result in communicating retransmission feedback (e.g., acknowledgement (ACK), non-acknowledgement (NACK), etc.) for multiple single carrier assignments. For example, if one or more of the single carrier assignments are lost, wireless device 102 will communicate NACK or nothing over the related feedback to wireless device 104. Wireless device 104, in this regard, cannot determine whether wireless device 102 received the grant related to the carrier (and is reporting NACK for this reason) or not. In this regard, in one example, wireless device 104 can indicate information regarding the multiple downlink resource grants in the respective multiple single carrier assignments. For example, wireless device 104 can utilize a downlink assignment index (DAI) in the downlink resource grants to specify an index or other identifier related to the downlink resource grant. The DAI, for example, can be a DAI (or similar to a DAI) defined in one or more releases of a 3GPP LTE specification. In addition, for instance, wireless device 104 can provide additional parameters, such as an index related to a total number of downlink resource grants, etc. in the DAI. In this regard, wireless device 102 can determine the number of grants and appropriately determine and communicate whether a grant is lost. In another example, for SC-FDMA, retransmission feedback resources can be mapped to fixed OFDM symbols instead of using cyclic shift and/or orthogonal sequence parameter indications, resulting in no ambiguity regarding the feedback.

In relaxed SC-FDMA, as described, wireless device 102 can provide feedback parameters over resources mapped to each carrier. Relaxed SC-FDMA, however, can require additional transmit power to provide the feedback parameters to wireless device 104 due at least in part to transmissions over other carriers. Thus, wireless device 102 can bundle retransmission feedback parameters over a portion of the resources, which can require less power to transmit. In addition, wireless device 102 can switch between providing retransmission feedback parameters over independent resources and bundling the parameters over a smaller number of resources depending on power requirements of wireless device 102. Bundling the retransmission feedback parameters, for example, can include transmitting a single retransmission feedback parameter representative of all retransmission feedback parameters (e.g., transmitting ACK when all feedback is ACK, or transmitting NACK when at least one feedback parameter is NACK) over one of the resources. In another example, bundling can include transmitting ACK only over resources mapped to the last carrier (e.g., in a sequence of multiple assigned carriers) having ACK feedback before a first carrier having NACK feedback. Such bundling, however, can additionally be subject to one or more of the ambiguities described above. Thus, for example, DAI can also be used for relaxed SC-FDMA to facilitate detecting lost grants, as similarly described above.

Figure 2:
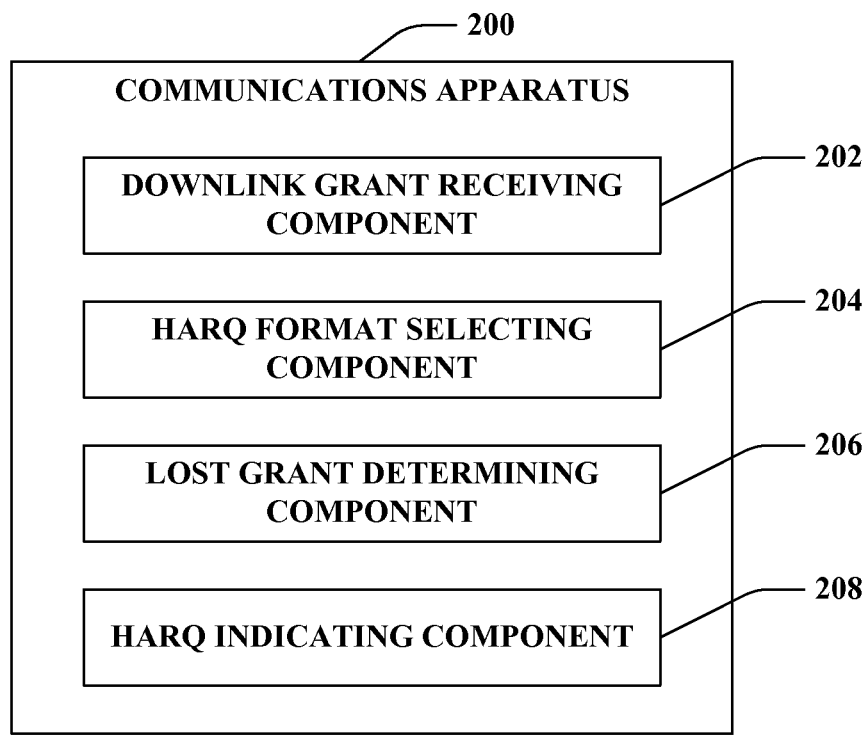
FIG. 2 is an illustration of an example communications apparatus for employment within a wireless communications environment.

Referring next to FIG. 2, a communications apparatus 200 that can participate in a wireless communications network is illustrated. The communications apparatus 200 can be an access point (e.g., a macrocell, femtocell, or picocell access point, a mobile access point, eNB, relay node, and/or the like), a mobile device (e.g., a UE, modem or other tethered device, and/or the like), a portion thereof, or substantially any device that communicates in a wireless network. The communications apparatus 200 can include a downlink grant receiving component 202 that obtains one or more downlink resource grants related to multiple single carrier assignments, a multicarrier assignment, and/or the like, and a HARQ format selecting component 204 that determines one or more schemes for indicating HARQ feedback relating to communications received over the carriers assigned in the downlink resource grants. Communications apparatus 200 additionally includes a lost grant determining component 206 that detects whether one or more downlink resource grants related to one or more carrier assignments is lost, as well as a HARQ indicating component 208 that transmits the HARQ feedback according to the determined scheme.

According to an example, downlink grant receiving component 202 can obtain one or more downlink resource grants related to one or more single carrier assignments, a multicarrier assignment, and/or the like. For example, as described, downlink grant receiving component 202 can obtain the one or more downlink resource grants according to SC-FDMA, relaxed SC-FDMA, and/or the like. In specific network standards, for example, the downlink resource grant can relate to an assignment of a physical downlink shared channel (PDSCH) transmission (e.g., in a 3GPP LTE standard), a downlink semi-persistent scheduling (SPS) release, and/or the like. In one example, downlink grant receiving component 202 can obtain multiple downlink resource grants related to multiple single carrier assignments for communicating with a disparate communications apparatus (now shown) using SC-FDMA. In this example, HARQ indicating component 208 can specify HARQ feedback for data received over the multiple downlink resource grants by utilizing one or more cyclic shifts and/or orthogonal sequence parameters related to corresponding uplink transmission. Thus, for example, based at least in part on whether to transmit ACK or NACK for data received over a downlink resource grant, HARQ indicating component 208 can modify cyclic shift and/or an orthogonal sequence utilized when sending corresponding transmissions on corresponding uplink resources (e.g., which can have been received in the downlink resource grant).

In addition, for example, downlink grant receiving component 202 can determine a DAI specified in the one or more downlink resource grants, which can be utilized to specify an index or other identifier related to the grant. Lost grant determining component 206 can utilize the DAI in one or more downlink resource grants to determine whether a downlink resource grant is missing. For example, the DAI can relate to an index of the downlink resource grant. Thus, for instance, given sequence numbers for the grant in the DAI, lost grant determining component 206 can discern whether there is a downlink resource grant is missing if a number in the sequence is absent (e.g., has not been received in a DAI). For example, the sequence numbers can correspond to a location of the downlink resource grant relative to other related downlink resource grants. Where the downlink resource grant is missing, HARQ indicating component 208 can indicate NACK or nothing over corresponding HARQ resources. As described, this can be indicated in one or more bits related to the one or more downlink resource grants using a cyclic shift and/or orthogonal sequence. In another example, the DAI can specify an index of a number of downlink resource grants provided by the disparate communications apparatus. In this example, lost grant determining component 206 can additionally determine lost downlink resource grants where it receives sequential grant indices in the DAIs, but is missing downlink resource grants having indices after the sequence. For example, lost grant determining component 206 can discern sequence numbers 1-3 in a plurality of downlink resource grants, but can also receive an indication in the DAI that there are 4 resource grants. In this regard, lost grant determining component 206 can discern that a downlink resource grant related to index 4 is missing, and HARQ indicating component 208 can specify NACK or nothing over a bit related to HARQ feedback for the downlink resource grant with index 4.

According to another example, HARQ indicating component 208 can provide HARQ feedback over fixed OFDM symbols allocated for each of the carriers related to the downlink resource grant. In this example, HARQ indicating component 208 can specify NACK or nothing over resources reserved for HARQ feedback of carriers for which a downlink resource grant is not received.

Moreover, in another example, downlink grant receiving component 202 can obtain multiple downlink resource grants related to multiple single carrier assignments, a single downlink resource grant related to a multicarrier assignment, and/or the like (e.g., from the disparate communications apparatus) in relaxed SC-FDMA. In this example, HARQ format selecting component 204 can determine a format for communicating HARQ feedback. As described, for example, HARQ format selecting component 204 can determine the format based at least in part on power requirements for communications apparatus 200. In one example, HARQ format selecting component 204 can determine to map HARQ feedback for communications received over the carriers on independent resources. As described, for example, HARQ format selecting component 204 can determine to map HARQ feedback for multiple single carrier assignments based at least in part on the first CCE location of each related downlink resource grant, HARQ feedback for a single multicarrier assignment based at least in part on the first N CCEs starting from the first CCE location of the respective downlink resource grant, and/or the like.

Where communications apparatus 200 has increased power requirements, however, HARQ format selecting component 204 can determine a format for HARQ feedback parameters that requires less power, such as bundling. In this example, HARQ format selecting component 204 can determine to bundle HARQ feedback parameters to transmit an ACK or NACK over one of the carriers. For example, HARQ format selecting component 204 can select a format where HARQ feedback is provided over resources related to a first CCE location, and the HARQ feedback relates to HARQ feedback for substantially all of the carriers (e.g., an ACK where HARQ feedback for all carriers is ACK, a NACK where at least one of the carriers has NACK feedback, etc.). In another example, HARQ format selecting component 204 can select a format where HARQ feedback is provided over resources related to the last carrier having ACK for HARQ feedback. In this regard, for example, a disparate communications apparatus receiving the HARQ feedback can determine ACK for the carrier related to the resource over which ACK is received and all prior carriers (and NACK or lost grant for the remaining carriers). In any case, HARQ indicating component 208 can specify HARQ feedback parameters according to the selected format.

Additionally, in this example, where HARQ format selecting component 204 determines to utilize ACK bundling, ambiguity can result in providing feedback for lost downlink resource grants since HARQ feedback resources are no longer independent for the multiple carriers, as described previously. Thus, in this example, lost grant determining component 206 can similarly detect lost grants based on DAI, as described above, where HARQ format selecting component 204 specifies bundling for HARQ feedback parameters. Thus, lost grant determining component 206 can determine whether one or more downlink resource grants are lost based at least in part on a sequence number in a DAI related to the downlink resource grants, a specified number of total downlink resource grants in the DAI, and/or the like, as described.

Figure 3:
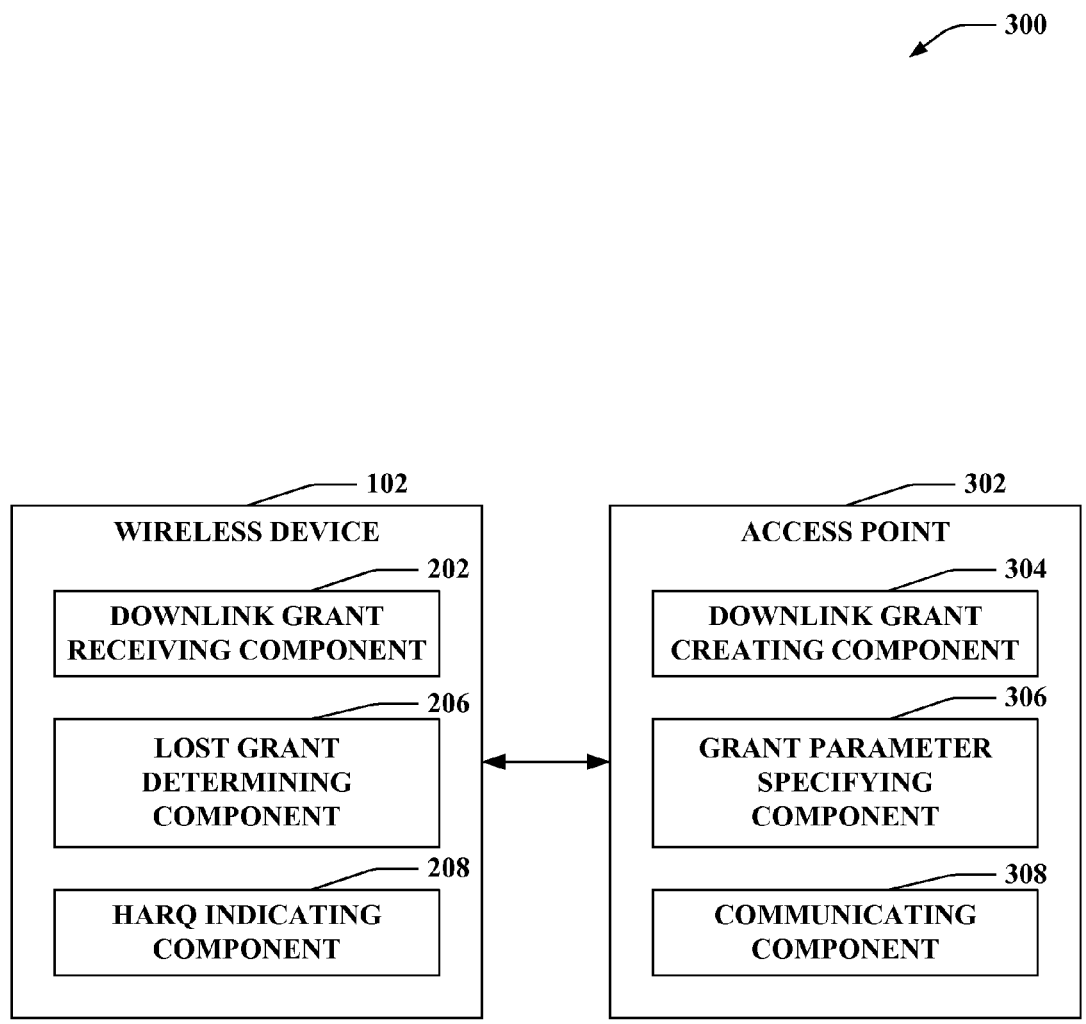
FIG. 3 illustrates a block diagram of an example wireless communications system for providing feedback related to a plurality of downlink resource grants.

Now referring to FIG. 3, illustrated is a wireless communications system 300 that facilitates communicating HARQ feedback for resources related to multiple carriers. System 300 includes a wireless device 102 that communicates with an access point 302 to receive access to a wireless network (not shown). As described, wireless device 102 can be substantially any type of base station, mobile device (including not only independently powered devices, but also modems, for example), UE, a portion thereof, etc., that receives access to a wireless network. Access point 302 can be a macrocell access point, femtocell access point, picocell access point, relay node, mobile base station, a portion thereof, and/or substantially any device that provides access to a wireless network. Moreover, system 300 can be a MIMO system and/or can conform to one or more wireless network system specifications (e.g., EV-DO, 3GPP, 3GPP2, 3GPP LTE, WiMAX, etc.). In addition, the components and functionalities of access point 302 can be present in wireless device 102 and vice versa, for example, to provide similar functionality.

Wireless device 102 can include a downlink grant receiving component 202 that obtains one or more downlink resource grants related to multiple single carrier assignments, a multicarrier assignment, and/or the like. Wireless device 102 additionally includes a lost grant determining component 206 that detects whether one or more downlink resource grants related to one or more carrier assignments is lost, as well as a HARQ indicating component 208 that transmits the HARQ feedback related to data received over the one or more downlink resource grants.

Access point 302 comprises a downlink grant creating component 304 that generates one or more downlink resource grants related to multiple single carrier assignments, a multicarrier assignment, and/or the like for a device, and a grant parameter specifying component 306 that includes one or more parameters in the one or more downlink resource grants. Access point 302 additionally includes a communicating component 308 that transmits the one or more downlink resource grants and related parameters to the device.

According to an example, downlink grant creating component 304 can allocate downlink resources in a downlink resource grant to wireless device 102 relating to a plurality of carriers (e.g., based at least in part on a request for network access from wireless device 102, one or more commands from an upstream network component, and/or the like). As described, in one example, the downlink grant creating component 304 can allocate resources related to PDSCH assignment, downlink SPS release, and/or the like. In an example, downlink grant creating component 304 can allocate the resources according to an SC-FDMA scheme. Grant parameter specifying component 306, for example, can associate additional information with the downlink resource grant, such as a grant sequence number or a number of grants where the downlink resource grant is in a group of downlink resource grants related to multiple single carrier assignments.

For example, as described, the plurality of carriers can be assigned per subframe, with respect to substantially all subframes, and/or the like. Thus, for example, where downlink grant creating component 304 allocates multiple carriers for substantially any subframe, grant parameter specifying component 306 can assign sequence numbers for each grant starting with the first grant, which can be assigned sequence number one, and so on. In another example, where downlink grant creating component 304 generates grants for multiple carriers that vary across subframes, grant parameter specifying component 306 can assign sequence numbers to the grants across subframes only and/or across subframes and carriers according to a sequence of the grants within the subframes and/or carriers. For example, where downlink grant creating component 304 creates a grant for carriers 1 and 2 in a first subframe and carriers 2 and 3 in a second subframe, grant parameter specifying component 306 can assign sequence number 1 to carrier 1 in the first subframe, sequence number 1 to carrier 2 in the first subframe, sequence number 2 to carrier 2 in the second subframe, and sequence number 1 to carrier 3 in the second subframe; in this regard, grant parameter specifying component 306 assigns the sequence numbers across subframes for the given carriers (numbering the carriers independently). For assigning sequence numbers across subframes and carriers, for example, grant parameter specifying component 306, in the previous example, can assign sequence number 1 to carrier 1 in the first subframe, sequence number 2 to carrier 2 in the first subframe, sequence number 3 to carrier 2 in the second subframe, and sequence number 4 to carrier 3 in the second subframe.

Moreover, as described, grant parameter specifying component 306 can additionally or alternatively include a total number of the grants within each grant, which can be calculated based on the total number of grants across carriers in a given subframe, the total number of grants across subframes for a given carrier, or the total number of grants across carriers and subframe, (e.g. depending on the sequence number assignment, described above, utilized by grant parameter specifying component 306). In addition, in one example, grant parameter specifying component 306 can convey the sequence numbers, total number of grants, and/or additional information in a DAI in the related downlink resource grant. For example, grant parameter specifying component 306 can determine the DAI based at least in part on a mapping of possible DAI values to the sequence numbers (e.g., an exact mapping, a function, etc.), the total number of grants, a combination, and/or the like. Communicating component 308 can transmit the one or more downlink resource grants to wireless device 102.

Downlink grant receiving component 202 can obtain the one or more downlink resource grants from access point 302. Lost grant determining component 206 can obtain one or more parameters regarding the one or more downlink resource grants, such as a sequence number, a total number of downlink resource grants in a related group, and/or the like, as described. In addition, for example, lost grant determining component 206 can obtain the one or more parameters from a DAI in one or more of the downlink resource grants. In an example, this can include applying a similar mapping utilized by grant parameter specifying component 306 (e.g., an exact mapping, a function, etc.) to map the DAI value to a sequence number, total number of grants, a combination, etc. It is to be appreciated that grant parameter specifying component 306 and lost grant determining component 206 can communicate parameters for mapping DAIs to sequence number information, obtain such parameters from a hardcoding, specification, configuration, etc., and/or the like.

Thus, for example, lost grant determining component 206 can discern whether one or more of the downlink resource grants are lost (e.g., or are not included in the received downlink resource grants) based at least in part on determining a missing sequence number based on the obtained sequence numbers (e.g., from the DAI or otherwise). For instance, if downlink resource grants with sequence numbers 1 and 3 are received, lost grant determining component 206 can determine that at least a downlink resource grant with sequence number 2 has not been received. As described, the sequence numbering can relate to a sequence number of the respective downlink resource grant in a plurality downlink resource grants in a given subframe, a sequence number related to each independent carrier across a plurality of subframes (e.g., where the sequence numbers are independent for given carriers), a sequence number across carriers over the plurality of subframes, etc. In addition, for example, lost grant determining component 206 can analyze an index of the number of downlink resource grants sent by access point 302 to determine whether one or more downlink resource grants are lost. Additionally or alternatively, grant parameter specifying component 306 can indicate the total number of downlink resource grants in the DAI, as a differential thereof, as a disparate message, etc., which can additionally require additional bits in the single carrier downlink control information (DCI) formats. As described, the total number of downlink resource grants can relate to a total number of grants across carriers in a given subframe, a total number of grants across subframes for each carrier (e.g., where the total number for each carrier is independent of grants on other carriers), a total number of grants across carriers and subframes, etc. Moreover, in this regard, lost grant determining component 206 can discern whether one or more downlink resource grants are lost based at least in part on comparing a number of received grants to the total number indicated (e.g., in a given subframe, per carrier across subframes, over a plurality of carriers across subframes, and/or the like).

HARQ indicating component 208 can specify ACK or NACK for the downlink resource grants and/or data received thereover. In an example, HARQ indicating component 208 can specify NACK or nothing over HARQ feedback resources related to the lost downlink resource grants, where the lost downlink resource grants can be explicitly determined (or NACK or nothing for all grants where the lost downlink resource grants cannot be explicitly determined). As described, for example, HARQ indicating component 208 can specify the HARQ feedback based at least in part on a cyclic shift and/or orthogonal sequence spreading of a related upstream communication, which can facilitate conveying 2 or more bits of data. In this regard, HARQ indicating component 208 can specify at least 4 HARQ feedback values, which can be associated with the one or more downlink resource grants, data received thereover, the one or more lost downlink resource grants, etc. Communicating component 308 can receive the HARQ feedback. In addition, downlink grant creating component 304 can determine whether one or more downlink resource grants were lost based at least in part on the HARQ feedback (e.g., where NACK is indicated after providing the one or more downlink resource grants), and can accordingly retransmit the downlink resource grant to wireless device 102. It is to be appreciated that NACK can relate to data received over the resources rather than lost grants; however, downlink grant creating component 304 can assume the grants are lost and retransmit the grants.

In another example, grant parameter specifying component 306 can specify one or more OFDM symbols for transmitting HARQ feedback related to the one or more downlink resource grants, and communicating component 308 can transmit information regarding the one or more OFDM symbols to wireless device 102. In an example, this can be a separate communication between access point 302 and wireless device 102. In this regard, downlink grant receiving component 202 can obtain the downlink resource grants from access point 302, as described above, which can include an identifier or some other indicator to associate a given downlink resource grant to an OFDM symbol for HARQ feedback. In this regard, HARQ indicating component 208 can specify HARQ feedback for data received over the resource grants using the OFDM symbols. If one or more downlink grants are not received that correspond to an OFDM symbol for which information is received from access point 302, for example, HARQ indicating component 208 can transmit NACK or nothing over the related OFDM symbol.

Downlink grant creating component 304 can determine that NACK is specified on the OFDM symbol and can retransmit the related downlink resource grant, as described. It is to be appreciated, for example, that the number of downlink resource grants created by downlink grant creating component 304 can be less than the number of OFDM symbols specified by grant parameter specifying component 306, in which case HARQ indicating component 208 can transmit NACK over the OFDM symbols without a related downlink resource grant. In addition, for example, access point 302 can decrease a number of OFDM symbols utilized to transmit a reference signal to allow additional symbols for transmitting HARQ feedback parameters (e.g., utilize 2 symbols instead of 3 for transmitting reference signals, leaving 5 symbols for HARQ feedback).

Figure 4:
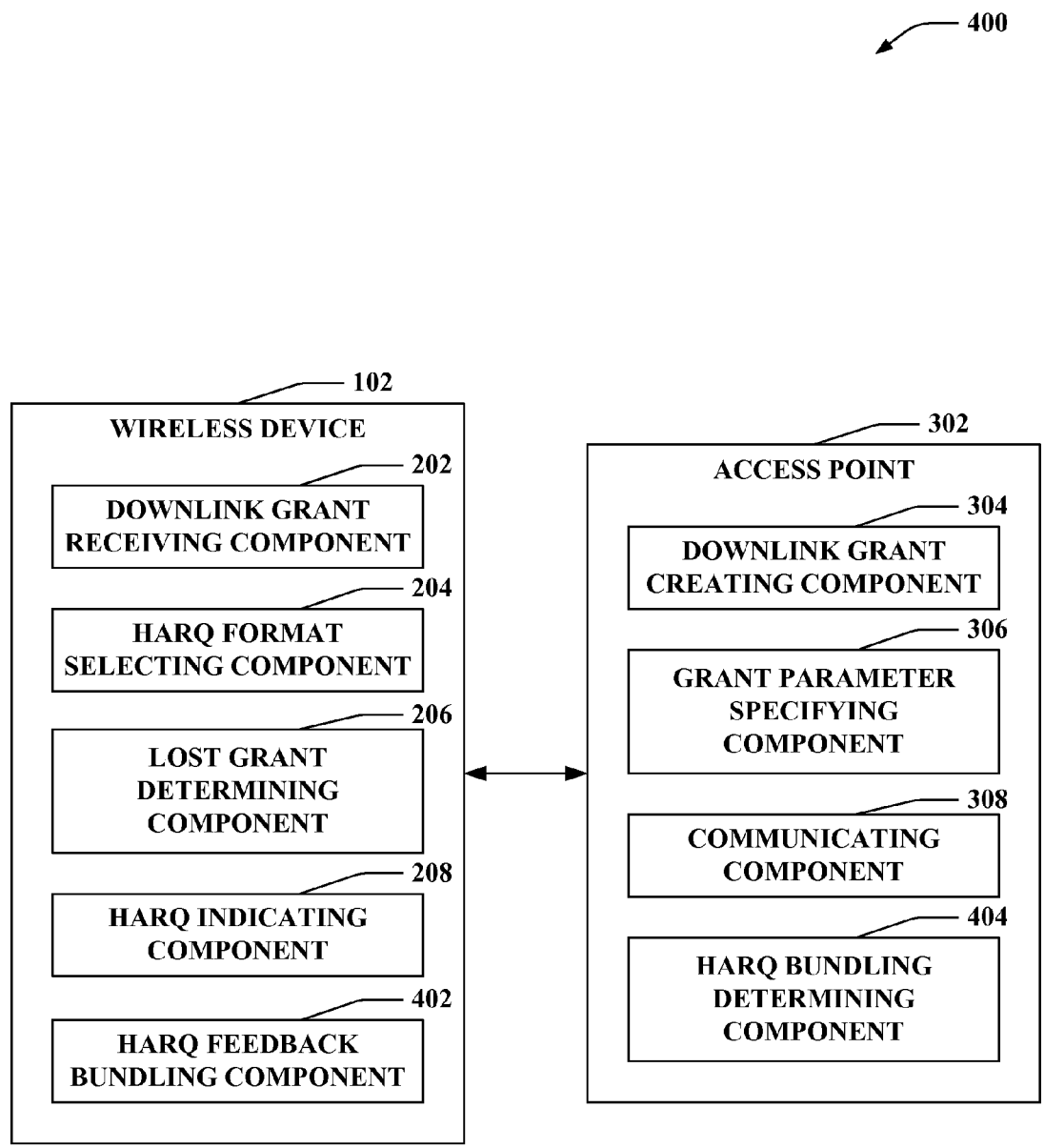
FIG. 4 illustrates a block diagram of an example wireless communications system that switches between bundling and not bundling feedback.

Turning to FIG. 4, an example wireless communication system 400 that facilitates communicating HARQ feedback for resource grants related to multiple carrier assignments is illustrated. System 400 includes a wireless device 102 that communicates with an access point 302 to receive access to a wireless network (not shown). As described, wireless device 102 can be substantially any type of base station, mobile device (including not only independently powered devices, but also modems, for example), UE, a portion thereof, etc., that receives access to a wireless network. Access point 302 can be a macrocell access point, femtocell access point, picocell access point, relay node, mobile base station, a portion thereof, and/or substantially any device that provides access to a wireless network. Moreover, system 400 can be a MIMO system and/or can conform to one or more wireless network system specifications (e.g., EV-DO, 3GPP, 3GPP2, 3GPP LTE, WiMAX, etc.). In addition, the components and functionalities of access point 302 can be present in wireless device 102 and vice versa, for example, to provide similar functionality.

Wireless device 102 can include a downlink grant receiving component 202 that obtains one or more downlink resource grants related to multiple single carrier assignments, a multicarrier assignment, and/or the like, as well as a HARQ format selecting component 204 that determines whether to bundle HARQ feedback. Wireless device 102 additionally includes a lost grant determining component 206 that detects whether one or more downlink resource grants related to one or more carrier assignments is lost, a HARQ indicating component 208 that transmits the HARQ feedback related to the one or more downlink resource grants and/or data received thereover, and a HARQ feedback bundling component 402 that combines HARQ feedback related to multiple carriers over HARQ feedback resources related to one (or at least a portion) of the carriers.

Access point 302 comprises a downlink grant creating component 304 that can create one or more downlink resource grants related to multiple single carrier assignments, a multicarrier assignment, and/or the like for a device, and a grant parameter specifying component 306 that includes one or more parameters in the one or more downlink resource grants. Access point 302 additionally includes a communicating component 308 that transmits the one or more downlink resource grants and related parameters to the device and a HARQ bundling determining component 404 that discerns whether the device is bundling HARQ feedback related to the one or more resource grants.

According to an example, downlink grant creating component 304 can allocate downlink resources in a downlink resource grant to wireless device 102 relating to a plurality of carriers (e.g., based at least in part on a request for network access from wireless device 102, one or more commands from an upstream network component, and/or the like). As described, the downlink resource grants can relate to carriers across multiple subframes, across any subframe, and/or the like. In an example, downlink grant creating component 304 can allocate the resources in relaxed SC-FDMA (e.g., where multiple resources can be utilized by wireless device 102 for communicating over a single carrier). Grant parameter specifying component 306, for example, can associate additional information with the downlink resource grants, such as a grant sequence numbers or a number of grants where the downlink resource grant is in a group of downlink resource grants related to multiple single carrier assignments. In one example, grant parameter specifying component 306 can convey the additional information in a given DAI in the related downlink resource grant. As described, this information can assist access point 302 in determining whether wireless device 102 is conveying feedback for a lost grant where wireless device 102 bundles HARQ feedback. Communicating component 308 can transmit the one or more downlink resource grants to wireless device 102.

Downlink grant receiving component 202 can obtain the one or more downlink resource grants from access point 302. HARQ format selecting component 204 can determine whether to bundle HARQ feedback resources for communicating to access point 302. As described, HARQ format selecting component 204 can determine such based at least in part on a power requirement of the wireless device 102. For example, where wireless device 102 is power limited (e.g., which can include measuring required power to determine whether it is over a threshold limit), HARQ format selecting component 204 can determine to bundle HARQ feedback resources. If HARQ format selecting component 204 determines to bundle HARQ feedback resources, for example, lost grant determining component 206 can obtain one or more parameters regarding the one or more downlink resource grants, such as sequence numbers related thereto, a number of downlink resource grants transmitted from access point 302, and/or the like (e.g., from a DAI, other parameter(s), a disparate message received from access point 302, and/or the like, as described above).

It is to be appreciated that lost grant determining component 206 need not determine the additional parameters related to the one or more downlink resource grants where HARQ format selecting component 204 determines not to bundle HARQ feedback resources since the HARQ feedback resources in this case are directly related to corresponding downlink resource grants. Thus, in this example, if one or more of the downlink resource grants are not received, NACK or nothing is sent by HARQ indicating component 208 over the related HARQ feedback resources.

In either case, HARQ indicating component 208 can determine HARQ feedback related to the one or more downlink resource grants (e.g., related to receiving data over the related resources). HARQ indicating component 208 can associate the HARQ feedback parameters with resources related to each of the one or more downlink resource grants, which can be based at least in part on the first CCE location of the one or more downlink resource grants. Where a single multicarrier grant is received at downlink grant receiving component 202, for example, HARQ feedback resources for the multiple carriers can be associated with the first N CCEs starting from the first CCE location of the downlink resource grant, as described. HARQ indicating component 208 can transmit the HARQ feedback parameters over the corresponding resources, as described, where HARQ format selecting component 204 does not specify to bundle HARQ feedback parameters. As described above, communicating component 308 can receive the HARQ feedback parameters, and downlink grant creating component 304 can determine whether one or more downlink resource grants is lost (e.g., based at least in part on receiving NACK or nothing over the related HARQ feedback resources where the last transmission is the downlink resource grant). In this case, downlink grant creating component 304 can retransmit the one or more downlink resource grants, as described. Additionally, as described in this example, downlink grant creating component 304 assumes NACK indicates that the grant is lost and not that the NACK relates to data thereover, and thus retransmits the related downlink resource grant (e.g., with data having the new data indicator (NDI) set to true).

Where HARQ format selecting component 204 determines to bundle HARQ feedback resources, HARQ feedback bundling component 402 can combine the HARQ feedback parameters for transmission over a portion of the resources for HARQ feedback to lower required transmission power. In an example, HARQ feedback bundling component 402 can combine the HARQ feedback parameters for transmission over resources related to one of the carriers. In one example, HARQ feedback bundling component 402 can transmit a HARQ feedback parameter indicative of all HARQ feedback parameters for the carriers over resources related to a first carrier corresponding to the one or more downlink resource grants (e.g., the first CCE location of the one or more downlink resource grants). As described, for example, HARQ feedback bundling component 402 can transmit ACK where all HARQ feedback parameters for the carriers corresponding to the one or more downlink resource grants are ACK (according to the HARQ indicating component 208), and NACK where at least one of the HARQ feedback parameters is NACK. Thus, communicating component 308 can obtain the single HARQ feedback parameter over the resources, and HARQ bundling determining component 404 can discern that wireless device 102 has bundled HARQ feedback parameters based at least in part on receiving only the one HARQ feedback parameter.

In this regard, where a NACK is received over the resources related to the first downlink resource grant, HARQ bundling determining component 404 can specify retransmitting substantially all of the one or more downlink resource grants, or related data, to wireless device 102 (since it does not know which one relates to the NACK). Thus, for example, since grant parameter specifying component 306 indicated information regarding the one or more downlink resource grants (e.g., the sequence numbers and/or number of grants in the group), lost grant determining component 206 can determine whether one or more downlink resource grants are lost and can indicate lost grants by specifying NACK or nothing over related HARQ feedback resources. In this regard, a NACK or nothing received over the HARQ feedback resources related to the first downlink resource grant can indicate that one or more for the downlink resource grants are lost, in an example. Downlink grant creating component 304, in this regard, can retransmit the one or more downlink resource grants to wireless device 102 along with related data over the downlink resource grants, as described, since it does not know which of the downlink resource grants had a corresponding NACK due to the bundling. Downlink grant receiving component 202 can obtain the one or more downlink resource grants and can ignore or discard grants for which ACK was previously reported by HARQ indicating component 208.

In another example, HARQ feedback bundling component 402 can combine HARQ feedback parameters by transmitting ACK over the resources related to the last downlink resource grant for which HARQ indicating component 208 specified ACK before a first downlink resource grant for which HARQ indicating component 208 specified NACK. As described, for example, if HARQ indicating component 208 specifies ACK for data received over downlink resource grants having sequence numbers 1, 2, and 4, and NACK over downlink resource grant having sequence number 3, HARQ feedback bundling component 402 can transmit ACK over the HARQ feedback resources related the downlink resource grant with sequence number 2. In this example, communicating component 308 can obtain the HARQ feedback parameter over the resources related to the downlink resource grant with sequence number 2. HARQ bundling determining component 404 can discern that wireless device 102 has bundled HARQ feedback parameters based at least in part on receiving only the one HARQ feedback parameter. In addition, HARQ bundling determining component 404 can interpret the ACK related to downlink resource grant 2 to determine that ACK is indicated for downlink resource grants 1 and 2, but NACK for 3 and 4 (and any other subsequently indexed downlink resource grants, which may have been lost), though HARQ indicating component 208 specified ACK for downlink resource grant 4.

In this regard, downlink grant creating component 304 can retransmit the downlink resource grants with sequence numbers 3 and 4 to wireless device 102. In addition, downlink grant creating component 304 can include new data related to the grants in the retransmission (e.g., data with NDI set to true). Downlink grant receiving component 202 can obtain the retransmissions (and/or data) and can ignore or discard the retransmission for carrier 4, since HARQ indicating component 208 previously indicated ACK for the carrier.

In yet another example, where lost grant determining component 206 discerns that a grant is lost, HARQ feedback bundling component 402 can transmit nothing over HARQ feedback resources to bundle HARQ feedback, which access point 302 can interpret to mean that at least one grant was lost. In addition, in this example, downlink grant creating component 304 can retransmit the one or more downlink resource grants based on not receiving HARQ feedback since it cannot determine which downlink resource grant is lost at wireless device 102.

Figure 5:
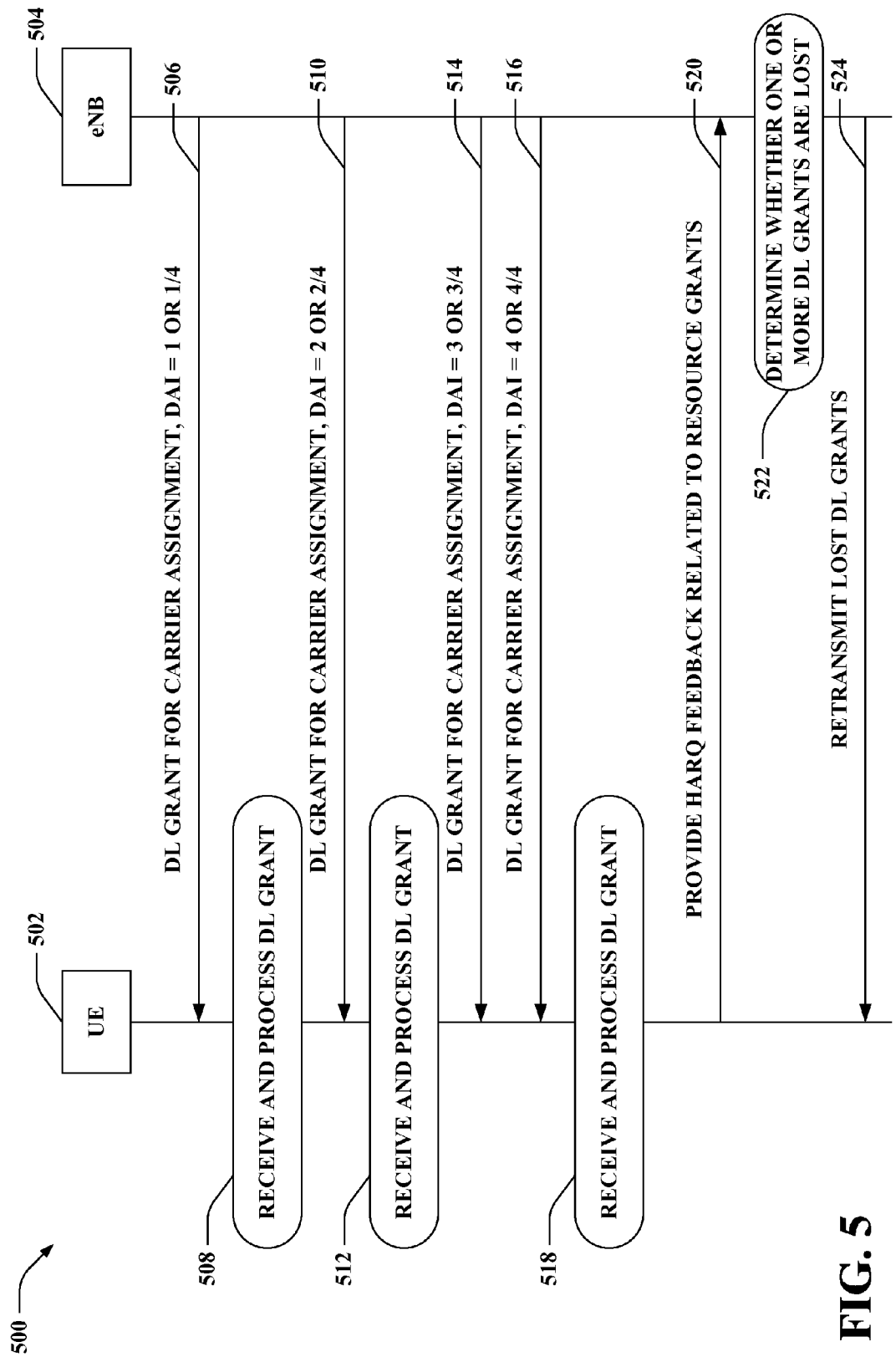
FIG. 5 illustrates a block diagram of an example wireless communications network that provides feedback related multiple assigned carriers.

Referring to FIG. 5, an example wireless communications network 500 that facilitates providing HARQ feedback for downlink resource grants related to multiple carriers is illustrated. Network 500 includes a UE 502, which can communicate with an eNB 504 to receive access to a wireless network. As described, for example, eNB 504 can provide multiple single carrier assignments to UE 502 (e.g., across subframes or for all subframes). In this regard, for example, eNB 504 can transmit a downlink (DL) grant for a carrier assignment 506 to UE 502. Within the DL grant 506, a DAI can indicate sequence number 1 and/or sequence number 1 with a total number of resource grants of 4 (e.g., 1/4). As described, for example, the total number of resource grants, if present, can be sent by eNB 504 as a differential to the sequence number, as a disparate parameter, in a disparate message, and/or the like. UE 502 can receive and process the DL grant 508, which can include storing DL grant information, monitoring the DL grant for communications, etc. In addition, in one example, DL grants such as DL grant 506 can also include new data, which UE 502 can process if properly received.

In addition, eNB 504 can transmit a DL grant for another carrier assignment 510 to UE 502, which can have a DAI that indicates sequence number 2 or 2/4. UE 502 can similarly receive and process DL grant 512. Moreover, eNB 504 can transmit a DL grant for another carrier assignment 514 to UE 502 with DAI indicating sequence number 3 or 3/4, however, UE does not receive and process this grant (e.g., due to interference or other communication fault with eNB 504, an error at UE 502, etc.). eNB 504 can also transmit a DL grant for another carrier 516 with DAI set to sequence number 4 or 4/4 to UE 502, and UE 502 can receive and process this DL grant 518. UE 502 can provide HARQ feedback related to the resource grants (or data received thereover) 520 to eNB 504.

As described, for example, UE 502 can indicate HARQ feedback over resources related to the DL grants. Depending on the allocation utilized (e.g., SC-FDMA, relaxed SC-FDMA, etc.), UE 502 can map HARQ feedback using a plurality of bits indicated by cyclic shift and/or orthogonal sequence of related uplink transmissions, individual OFDM symbols or resources related to the DL grants, and/or the like, as described. In addition, for example, UE 502 can bundle the HARQ feedback over a single resource related to one of the DL grants, as described, for power limited scenarios in relaxed SC-FDMA. In an example, UE 502 can determine there are 4 DL grants transmitted by eNB 504, based at least in part on DAI of the one or more DL grants. Thus, UE 502 can also determine that it did not receive a DL grant with sequence number 3 and can indicate NACK for related HARQ feedback.

Thus, for example, providing HARQ feedback related to the resource grants 520 can include UE 502 specifying nothing or NACK over bits or resources related to sequence number 3. In another example, providing HARQ feedback related to the resource grants 520 can include UE 502 bundling all HARQ feedback on resources related to DL grant with sequence number 1, and thus indicating NACK since one of the DL grants is NACK. In yet another example, as described, providing HARQ feedback related to the resource grants 520 can include UE 502 bundling all HARQ feedback on resources related to the last DL grant indicating ACK before the first DL grant indicating NACK, which is DL grant with sequence number 2, and indicating ACK thereover.

Based on the HARQ feedback, in this regard, eNB 504 can determine whether one or more DL grants are lost 522, as described above. Thus, in an example, eNB 504 can determine that DL grant with sequence number 3 was lost as indicated over resource related thereto, and eNB 504 can retransmit the DL grant with sequence number 3 524 to UE 502. In another example, eNB 504 can determine one of the DL grants was lost based on receiving NACK over resources related to DL grant with sequence number 1 and nothing over remaining HARQ resources. In this example, eNB 504 can retransmit all of the DL grants 524 to UE 502. In yet another example, eNB 504 can determine that only DL grants with sequence numbers 1 and 2 are received based at least in part on receiving ACK over HARQ resources related only to the DL grant with sequence number 2. Thus, eNB 504 can retransmit the DL grants with sequence numbers 3 and 4 524 to UE 502. In either of the latter cases, UE 502 can ignore the additional DL grants for which it previously indicated ACK, but bundled HARQ resources to conserve power. In addition, it is to be appreciated NACK can refer to data received over the DL grant and not the DL grant itself In this case, however, eNB 504 assumes the DL grant is lost and retransmits the DL grant (e.g., with the data). UE 502 can accordingly ignore what it does not need.

Referring now to FIGS. 6-9, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 6:
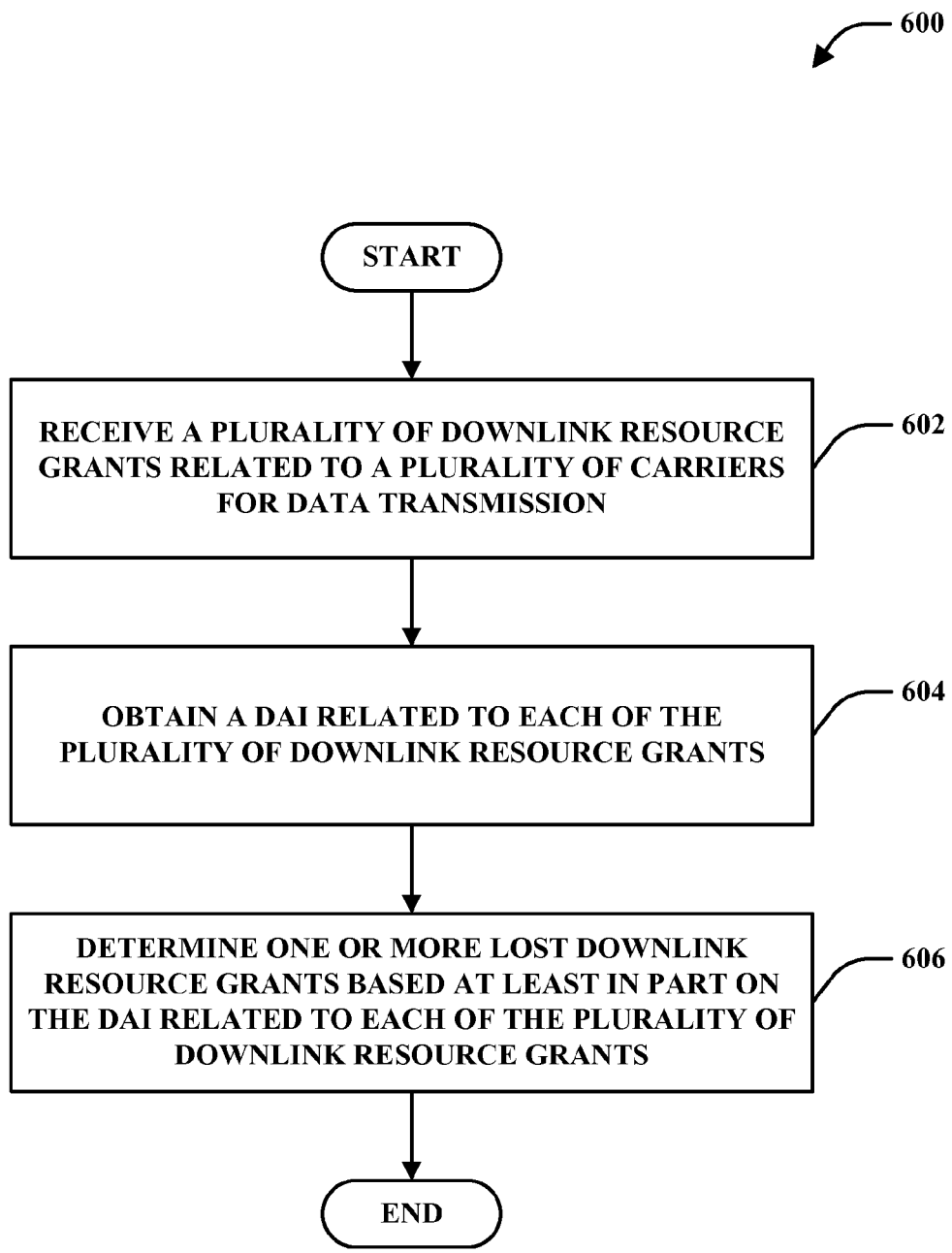
FIG. 6 is a flow diagram of an example methodology that determines one or more lost downlink resource grants.

With reference to FIG. 6, illustrated is an example methodology 600 for determining lost downlink resource grants based at least in part on received sequence information. At 602, a plurality of downlink resource grants related to a plurality of carriers can be received for data transmission. As described, for example, the plurality of downlink resource grants can be received in SC-FDMA or relaxed SC-FDMA as multiple single carrier assignments, a single multiple carrier assignment, and/or the like. In addition, as described, the downlink resource grants can relate to multiple carriers across multiple subframes (e.g., where carrier assignments can change per subframe), multiple carriers across all subframes, etc. At 604, a DAI related to each of the plurality of downlink resource grants can be obtained. The DAI can relate to a sequence number for the downlink resource grant within a group of downlink resource grants, a total number of the downlink resource grants, and/or the like as described. Moreover, as described, the sequence number and/or total number can relate to the downlink resource grant(s) across a plurality of carriers in a given subframe, for a given carrier across subframes, or over a plurality of carriers across a plurality of subframes. At 606, one or more lost downlink resource grants can be determined based at least in part on the DAI related to each of the plurality of downlink resource grants. HARQ feedback for the lost downlink resource grants can be reported for retransmission thereof, as described.

Figure 7:
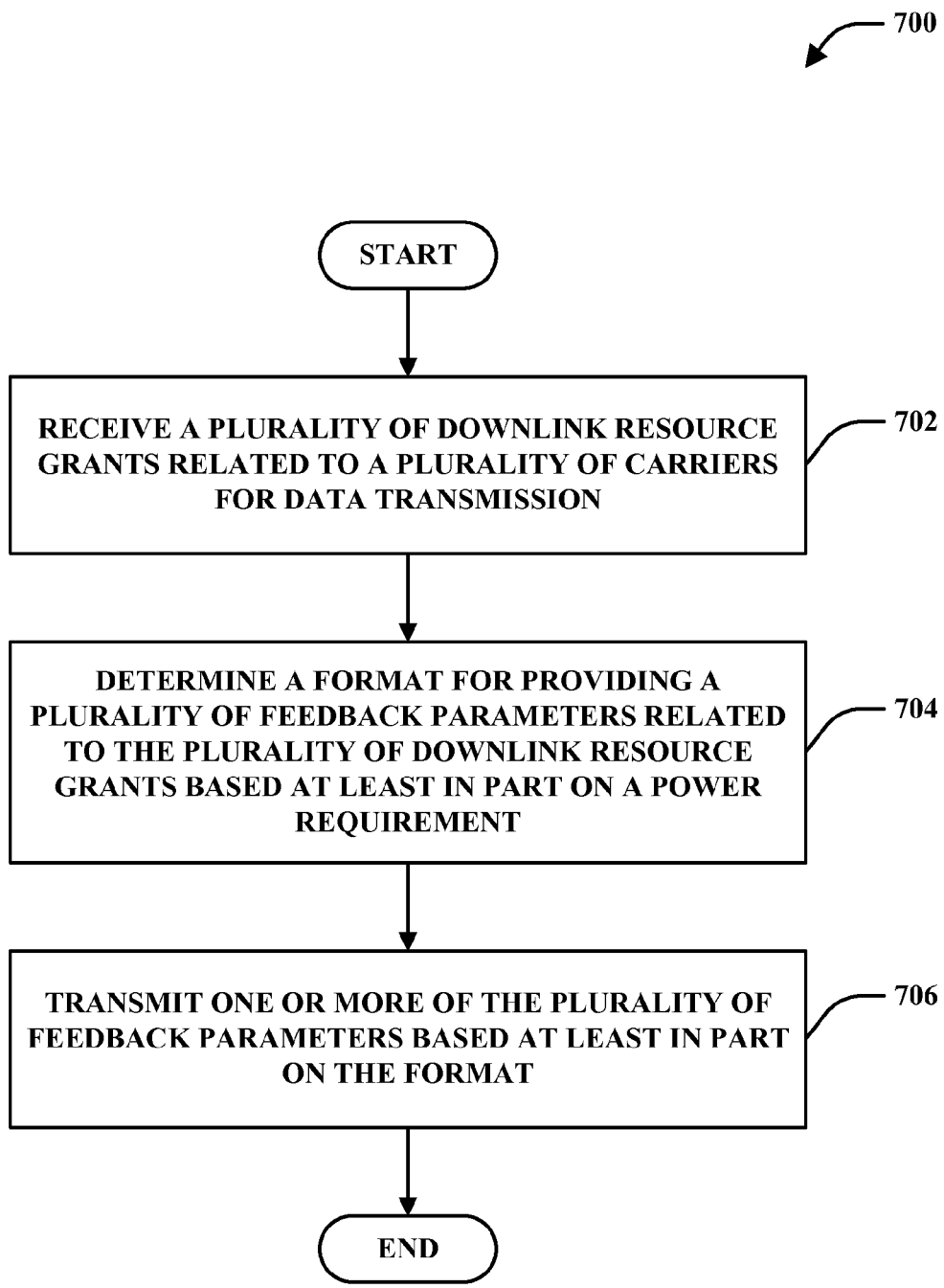
FIG. 7 is a flow diagram of an example methodology that determines whether to bundle or not bundle feedback parameters.

Turning to FIG. 7, an example methodology 700 is illustrated that facilitates switching between bundling and not bundling feedback parameters. At 702, a plurality of downlink resource grants related to a plurality of carriers can be received for data transmission. At 704, a format for providing a plurality of feedback parameters related to the plurality of downlink resource grants can be determined based at least in part on a power requirement. Thus, for example, where more power is required, a bundling format can be determined to conserve power. At 706, one or more of the plurality of feedback parameters can be transmitted based at least in part on the format. As described, where the format indicates bundling, feedback parameters can be bundled by transmitting ACK over a feedback resource related to a first downlink resource grants where feedback related to all downlink resource grants is ACK, or NACK where feedback related at least one downlink resource grant is NACK. In another example, bundling can include transmitting ACK over feedback resource related to the last downlink resource grant that indicates ACK before the first downlink resource grant that indicates NACK. In yet another example, bundling can include transmitting nothing where NACK is indicated for at least one of the downlink resource grants.

Figure 8:
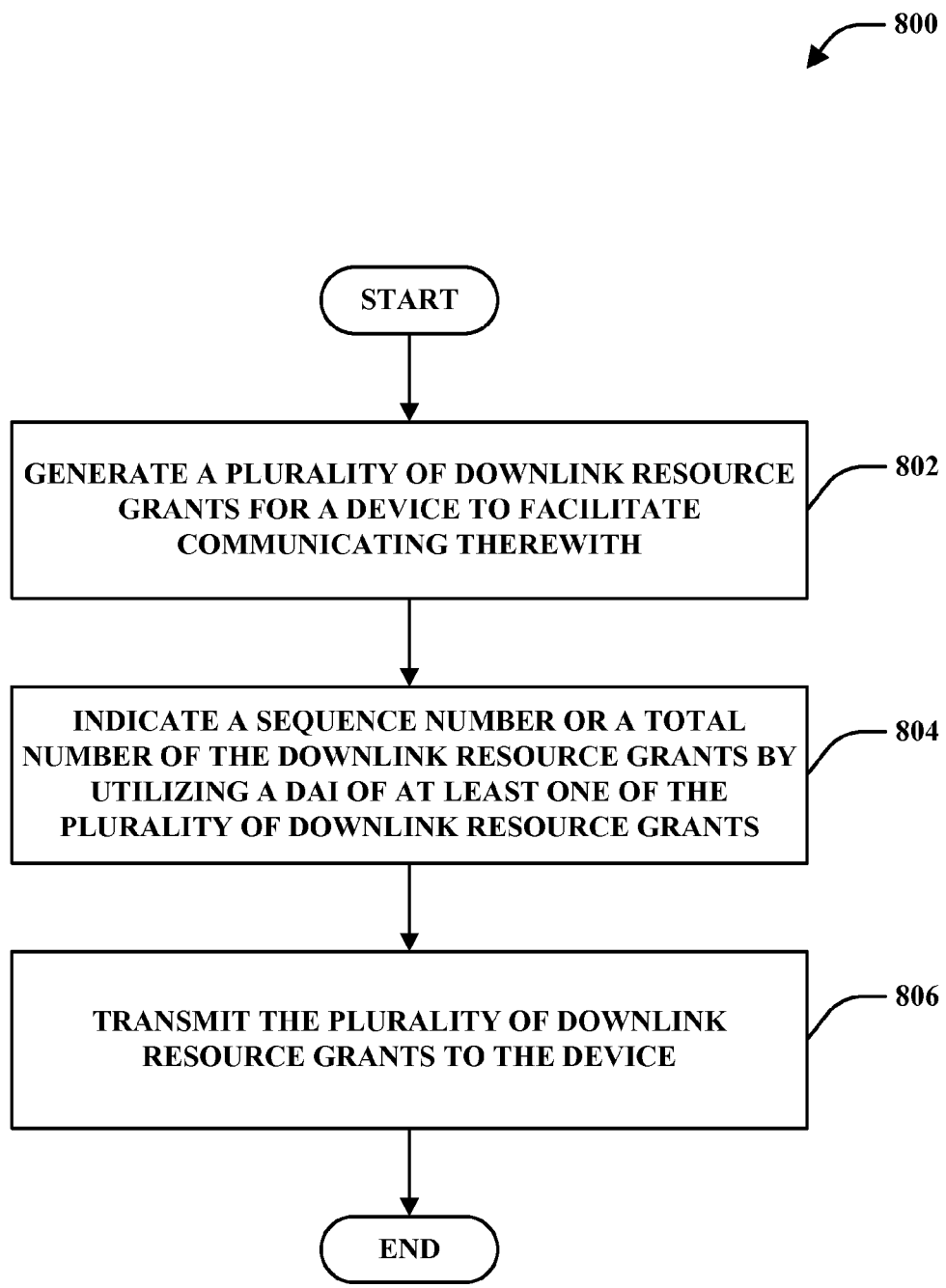
FIG. 8 is a flow diagram of an example methodology that provides downlink resource grants with indicated sequence numbers.

Turning to FIG. 8, an example methodology 800 is illustrated that facilitates indicating sequence numbers in multiple downlink resource grants. At 802, a plurality of downlink resource grants can be generated for a device to facilitate communicating therewith. As described, this can include multiple single carrier assignments, a single multicarrier assignment, etc. in SC-FDMA, relaxed SC-FDMA, and/or the like. At 804, a sequence number or a total number of the downlink resource grants can be indicated utilizing a DAI of at least one of the plurality of downlink resource grants. As described, the DAI can be mapped to indicate a sequence number and/or total number of grants by an exact mapping, a formula, and/or the like. Moreover, as described, the sequence number and/or total number can relate to the downlink resource grant(s) across a plurality of carriers in a given subframe, for a given carrier across subframes, or over a plurality of carriers across a plurality of subframes. At 806, the plurality of downlink resource grants can be transmitted to the device.

Figure 9:
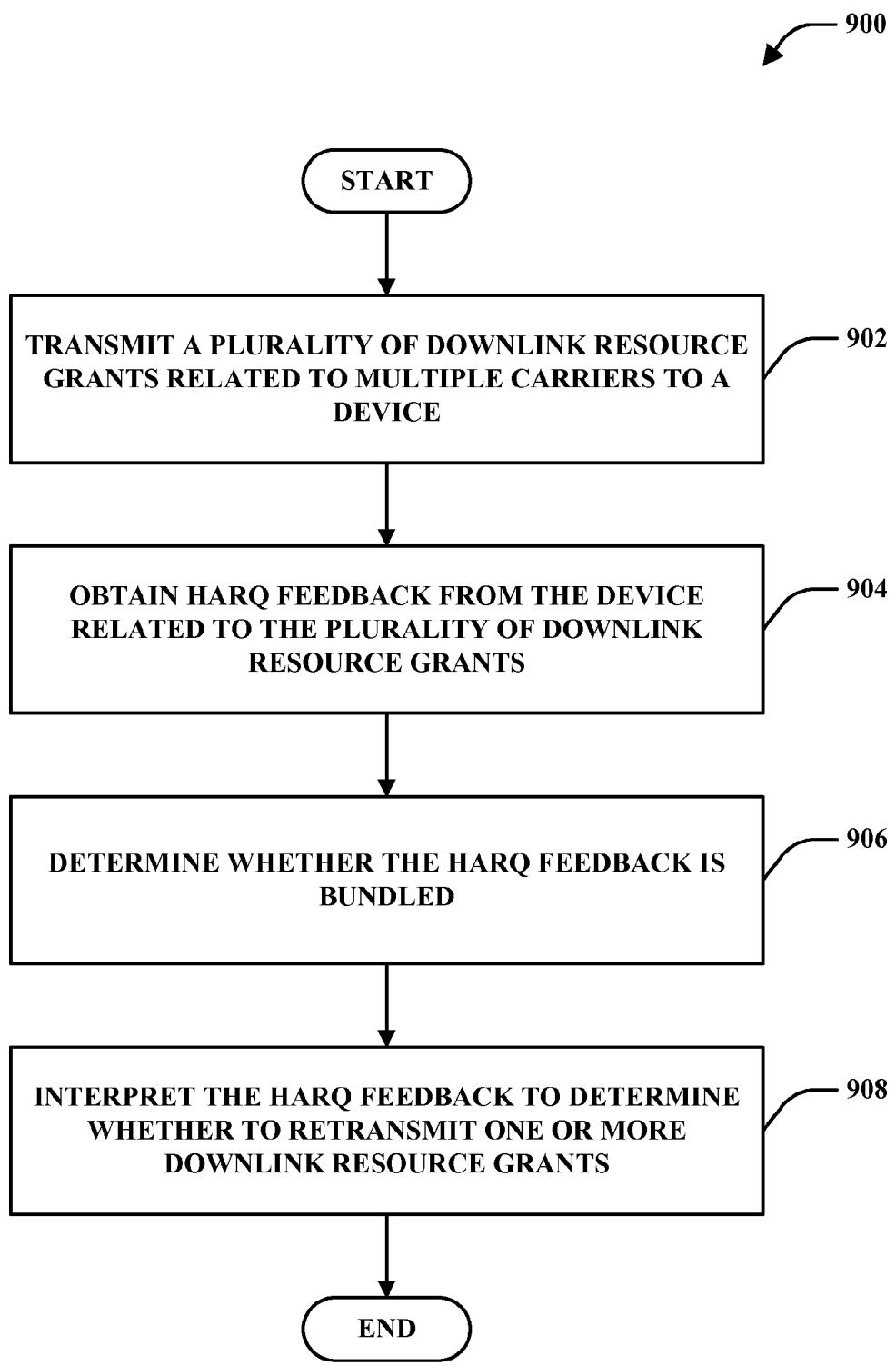
FIG. 9 is a flow diagram of an example methodology that determines whether feedback parameters are bundled.

Referring to FIG. 9, an example methodology 900 is illustrated that facilitates determining whether HARQ feedback parameters are bundled. At 902, a plurality of downlink resource grants related to multiple carriers can be transmitted to a device. As described, the plurality of downlink resource grants can each indicate sequence numbers and/or the like to facilitate determining lost resource grants. At 904, HARQ feedback related to the plurality of downlink resource grants can be obtained from the device. As described, multiple HARQ feedback parameters can be bundled on a single parameter. At 906, it can be determined whether the HARQ feedback is bundled. For example, if the HARQ feedback is received over a single HARQ resource, then the feedback has been bundled for multiple downlink resource grants, as described. At 908, the HARQ feedback can be interpreted to determine whether to retransmit one or more downlink resource grants (e.g., where one or more of the feedback parameters are NACK).

It will be appreciated that, in accordance with one or more aspects described herein, inferences can be made regarding determining whether one or more downlink resource grants are lost, bundling HARQ feedback, specifying HARQ feedback, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 10:
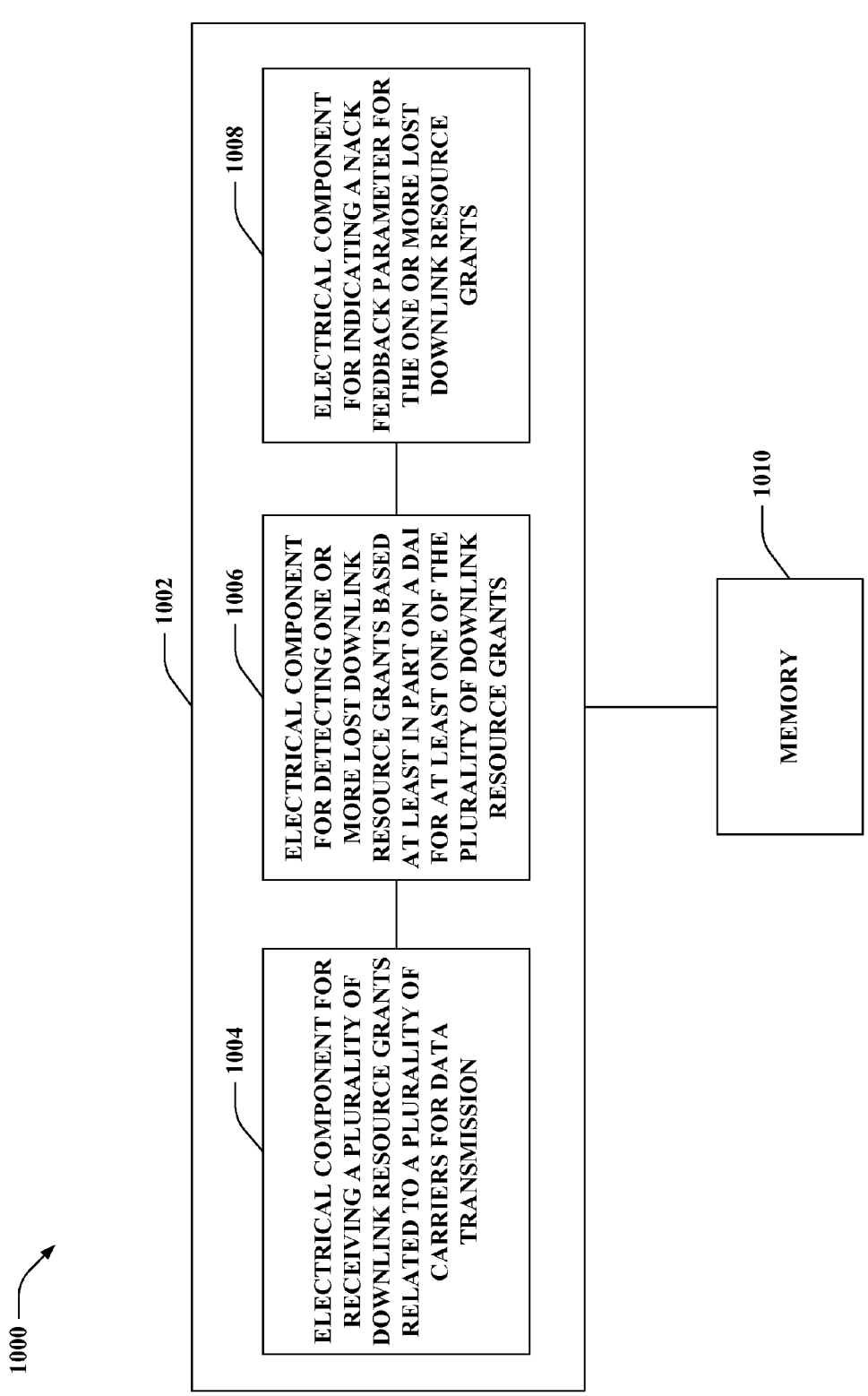
FIG. 10 is a block diagram of an example apparatus that facilitates detecting lost grants and reporting associated feedback.

With reference to FIG. 10, illustrated is a system 1000 that determines one or more lost grants based at least in part on sequence numbers in one or more downlink resource grants. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for receiving a plurality of downlink resource grants related to a plurality of carriers for data transmission 1004. In one example, as described, the downlink resource grants can be received in a single assignment or multiple assignments in SC-FDMA, relaxed SC-FDMA, etc. Further, logical grouping 1002 can comprise an electrical component for detecting one or more lost downlink resource grants based at least in part on a DAI for at least one of the plurality of downlink resource grants 1006.

As described, for example, the DAI can relate to a sequence number, a total number of the downlink resource grants, and/or the like. In this regard, for example, electrical component 1006 can determine that it received downlink resource grants related to sequence numbers 1, 2, 4, and thus a downlink resource grant with sequence number 3 is lost based on the sequence numbers. In another example, electrical component 1006 can determine that it received only 3 downlink resource grants when a total number of 4 is specified in the DAI. Moreover, logical grouping 1002 includes an electrical component for indicating a NACK feedback parameter for the one or more lost downlink resource grants 1008. This can cause retransmission of the lost downlink resource grant, as described, or one or more additional resource grants where the exact lost downlink resource grant cannot be determined. In addition, the NACK feedback parameter can be bundled with other feedback parameters, as described in one example. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

Figure 11:
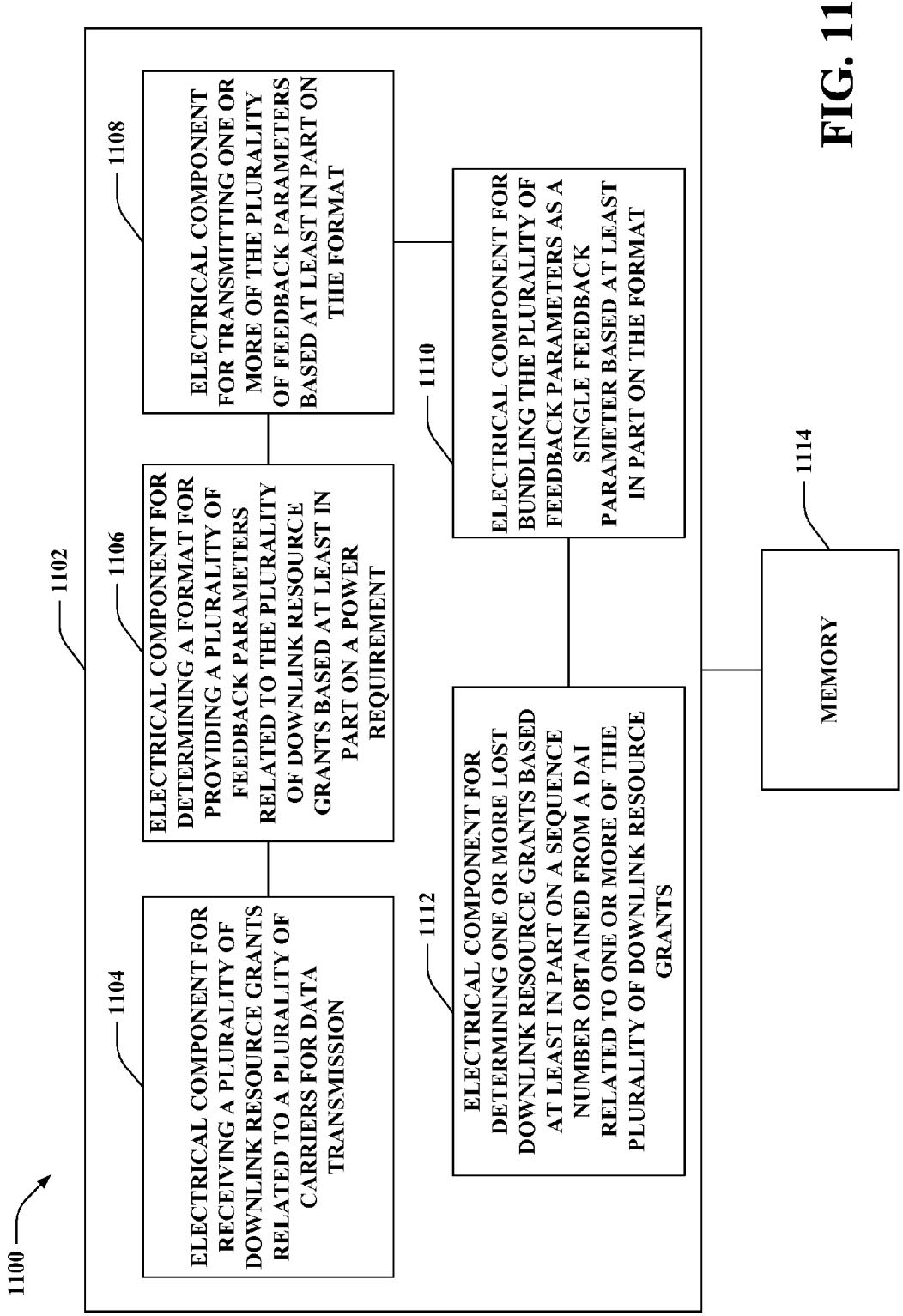
FIG. 11 is a block diagram of an example apparatus that switches between bundling and not bundling feedback parameters.

With reference to FIG. 11, illustrated is a system 1100 that determines whether to bundle feedback parameters. For example, system 1100 can reside at least partially within a base station, mobile device, etc. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for receiving a plurality of downlink resource grants related to a plurality of carriers for data transmission 1004. As described, this can be multiple single carrier grants, a multicarrier grant, and/or the like. Further, logical grouping 1102 can comprise an electrical component for determining a format for providing a plurality of feedback parameters related to the plurality of downlink resource grants based at least in part on a power requirement 1106. Thus, for example, where additional power is required for transmitting, feedback parameters can be bundled to conserve power.

Moreover, logical grouping 1102 includes an electrical component for transmitting one or more of the plurality of feedback parameters based at least in part on the format 1108. Logical grouping 1102 can also include an electrical component for bundling the plurality of feedback parameters as a single feedback parameter based at least in part on the format 1110. Thus, where the format specifies a bundling of feedback parameters, electrical component 1110 can appropriately bundle the feedback parameters. This can include transmitting a representative feedback parameter over resources related to a first downlink resource grant, an ACK over resources related to a last downlink resource grant indicating ACK before a first downlink resource grant indicating NACK, transmitting nothing where at least one of the downlink resource grants indicates NACK, and/or the like, as described.

In addition, logical grouping 1102 can include an electrical component for determining one or more lost downlink resource grants based at least in part on a sequence number obtained from a DAI related to one or more of the plurality of downlink resource grants 1112. As described, electrical component 1112 can determine that one or more sequence numbers are missing based at least in part on sequence number received. Moreover, electrical component 1108 can transmit NACK for lost downlink resource grants, as described. Additionally, system 1100 can include a memory 1114 that retains instructions for executing functions associated with electrical components 1104, 1106, 1108, 1110, and 1112. While shown as being external to memory 1114, it is to be understood that one or more of electrical components 1104, 1106, 1108, 1110, and 1112 can exist within memory 1114.

Figure 12:
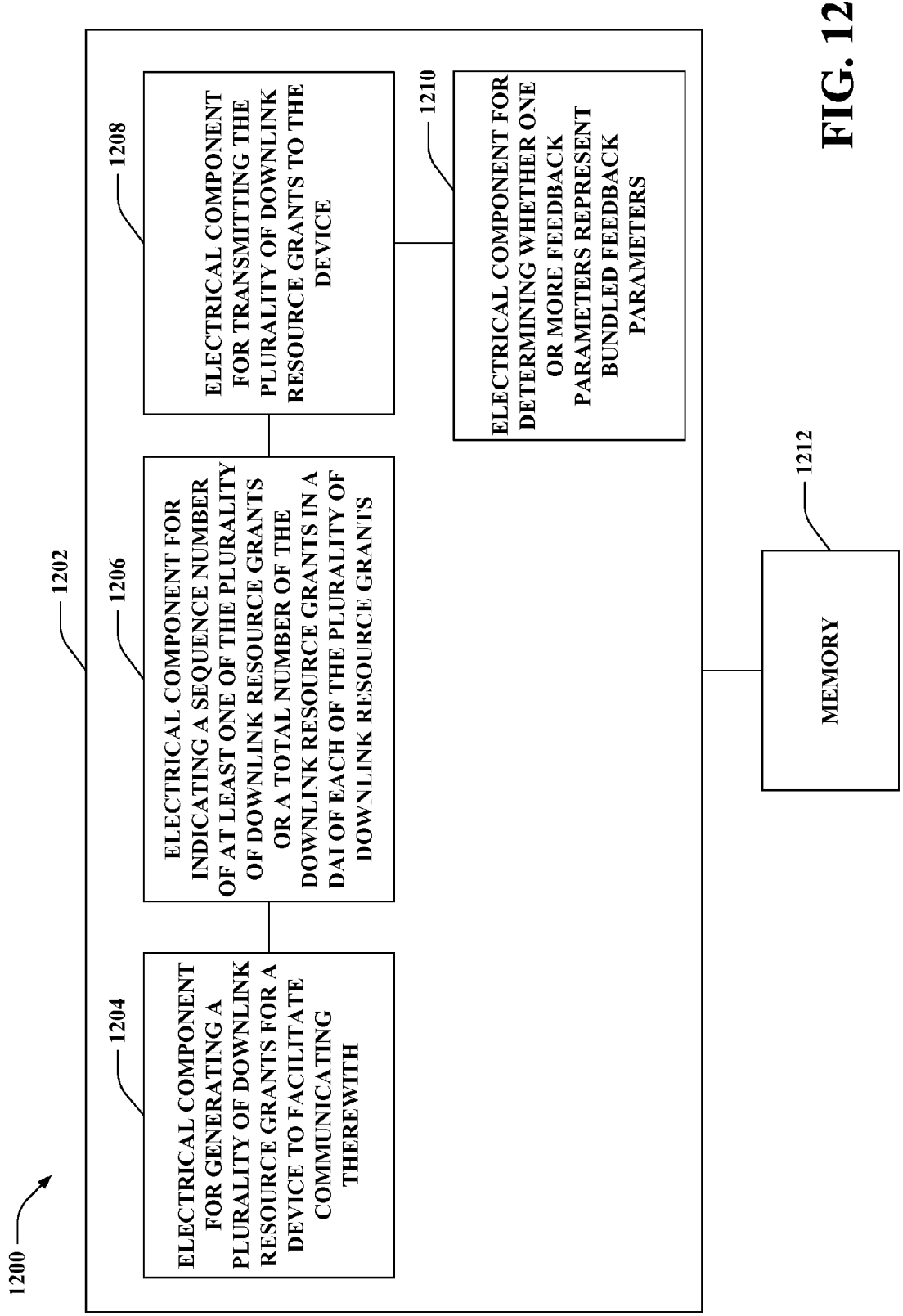
FIG. 12 is a block diagram of an example apparatus that assigns sequence numbers to provided downlink resource grants.

With reference to FIG. 12, illustrated is a system 1200 that indicates sequence numbers in downlink resource grants to facilitate detecting lost grants. For example, system 1200 can reside at least partially within a base station, mobile device, etc. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for generating a plurality of downlink resource grants for a device to facilitate communicating therewith 1204. Further, logical grouping 1202 can comprise an electrical component for indicating a sequence number of at least one of the plurality of downlink resource grants or a total number of the downlink resource grants in a DAI of each of the plurality of downlink resource grants 1206. As described, the sequence number and/or total number can relate to the downlink resource grant(s) across a plurality of carriers in a given subframe, for a given carrier across subframes, or over a plurality of carriers across a plurality of subframes Moreover, logical grouping 1202 includes an electrical component for transmitting the plurality of downlink resource grants to the device 1208. As described, this can include transmitting a plurality of single carrier assignments, a multicarrier assignment, and/or the like. Logical grouping 1202 can also include an electrical component for determining whether one or more feedback parameters represent bundled feedback parameters 1210. As described, feedback parameters can be received from the device, and the device can bundle feedback parameters based on power requirements. Electrical component 1210 can determine whether feedback parameters are bundled based at least in part on whether the parameters are received as a single parameter and/or the like, as described. Additionally, system 1200 can include a memory 1212 that retains instructions for executing functions associated with electrical components 1204, 1206, 1208, and 1210. While shown as being external to memory 1212, it is to be understood that one or more of electrical components 1204, 1206, 1208, and 1210 can exist within memory 1212.

Figure 13:
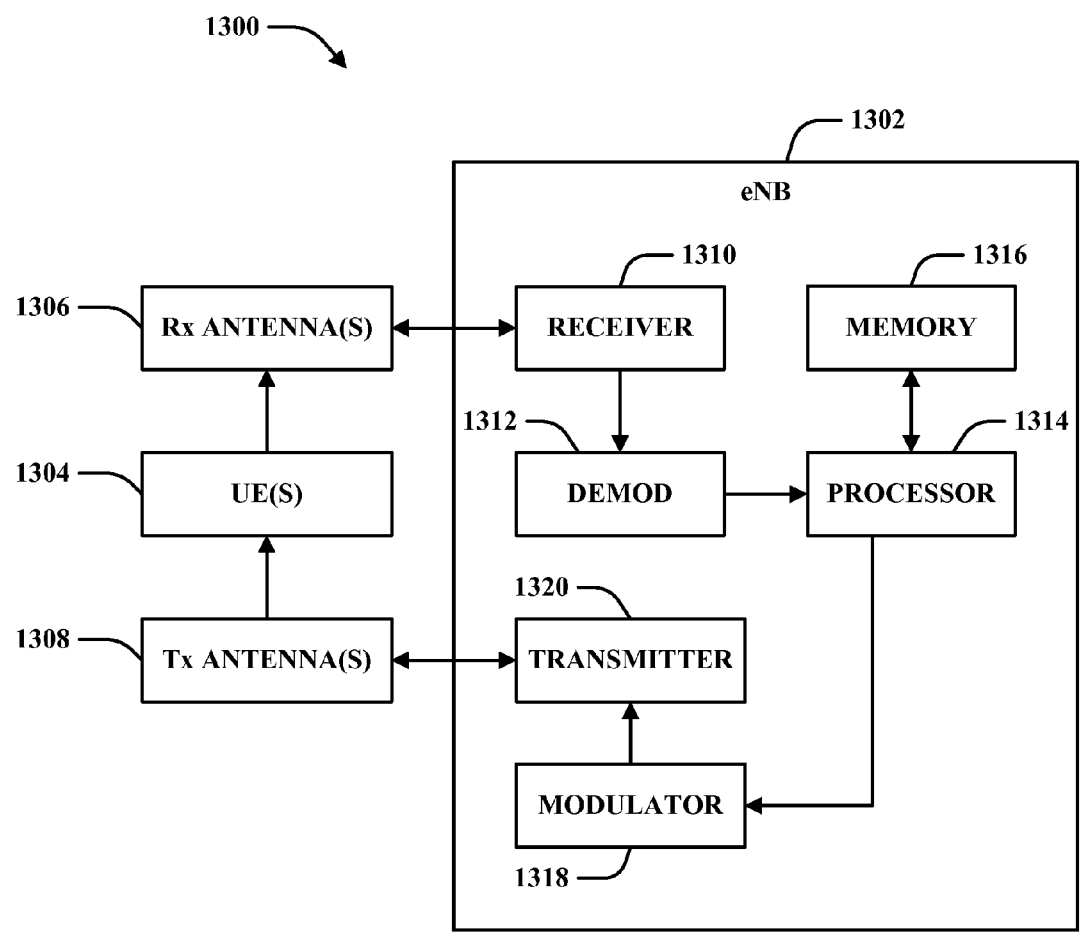
FIGS. 13-14 are block diagrams of example wireless communication devices that can be utilized to implement various aspects of the functionality described herein.

FIG. 13 is a block diagram of a system 1300 that can be utilized to implement various aspects of the functionality described herein. In one example, system 1300 includes a base station or eNB 1302. As illustrated, eNB 1302 can receive signal(s) from one or more UEs 1304 via one or more receive (Rx) antennas 1306 and transmit to the one or more UEs 1304 via one or more transmit (Tx) antennas 1308.

Additionally, eNB 1302 can comprise a receiver 1310 that receives information from receive antenna(s) 1306. In one example, the receiver 1310 can be operatively associated with a demodulator (Demod) 1312 that demodulates received information. Demodulated symbols can then be analyzed by a processor 1314. Processor 1314 can be coupled to memory 1316, which can store information related to code clusters, access terminal assignments, lookup tables related thereto, unique scrambling sequences, and/or other suitable types of information. In one example, eNB 1302 can employ processor 1314 to perform methodologies 600, 700, 800, 900, and/or other similar and appropriate methodologies. eNB 1302 can also include a modulator 1318 that can multiplex a signal for transmission by a transmitter 1320 through transmit antenna(s) 1308.

Figure 14:
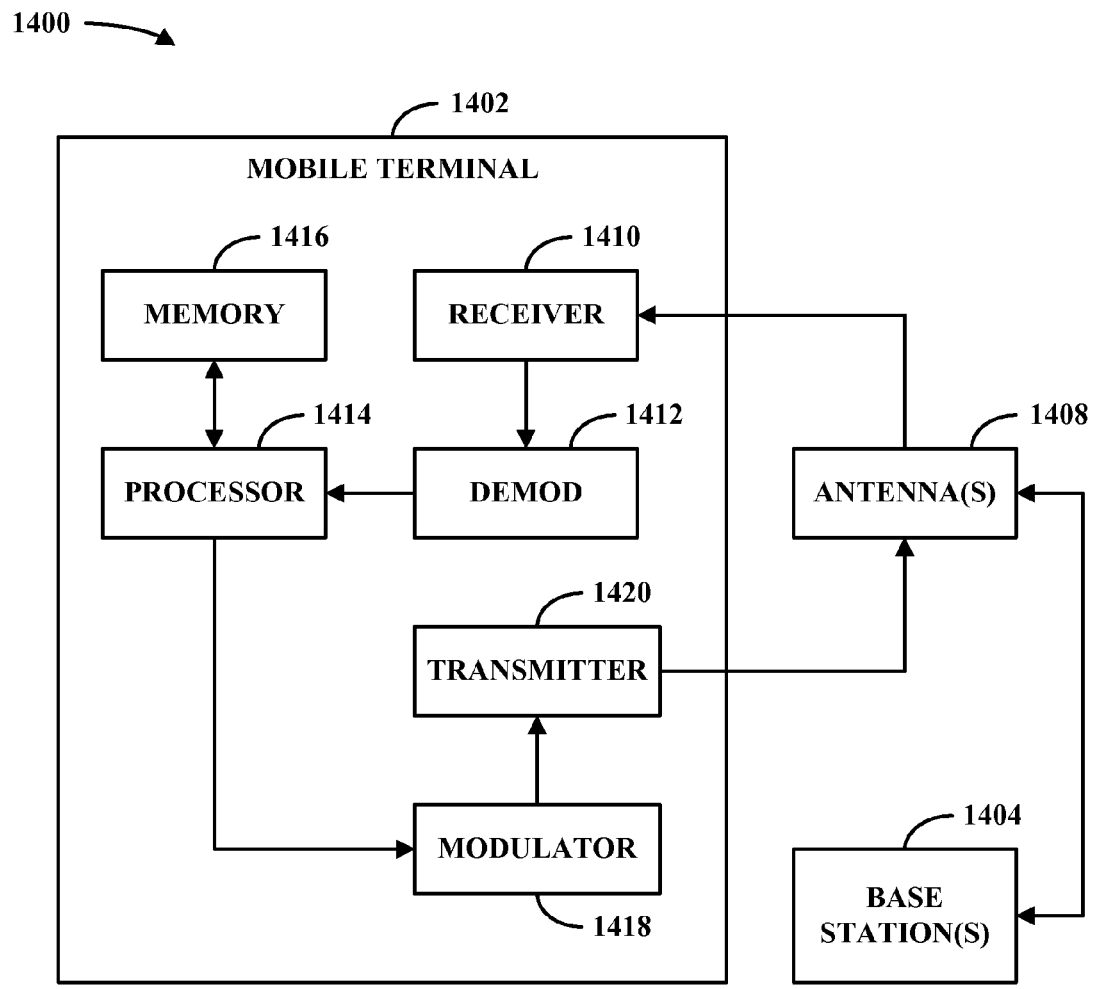

FIG. 14 is a block diagram of another system 1400 that can be utilized to implement various aspects of the functionality described herein. In one example, system 1400 includes a mobile terminal 1402. As illustrated, mobile terminal 1402 can receive signal(s) from one or more base stations 1404 and transmit to the one or more base stations 1404 via one or more antennas 1408. Additionally, mobile terminal 1402 can comprise a receiver 1410 that receives information from antenna(s) 1408. In one example, receiver 1410 can be operatively associated with a demodulator (Demod) 1412 that demodulates received information. Demodulated symbols can then be analyzed by a processor 1414. Processor 1414 can be coupled to memory 1416, which can store data and/or program codes related to mobile terminal 1402. Additionally, mobile terminal 1402 can employ processor 1414 to perform methodologies 600, 700, 800, 900, and/or other similar and appropriate methodologies. Mobile terminal 1402 can also employ one or more components described in previous figures to effectuate the described functionality; in one example, the components can be implemented by the processor 1414. Mobile terminal 1402 can also include a modulator 1418 that can multiplex a signal for transmission by a transmitter 1420 through antenna(s) 1408.

Figure 15:
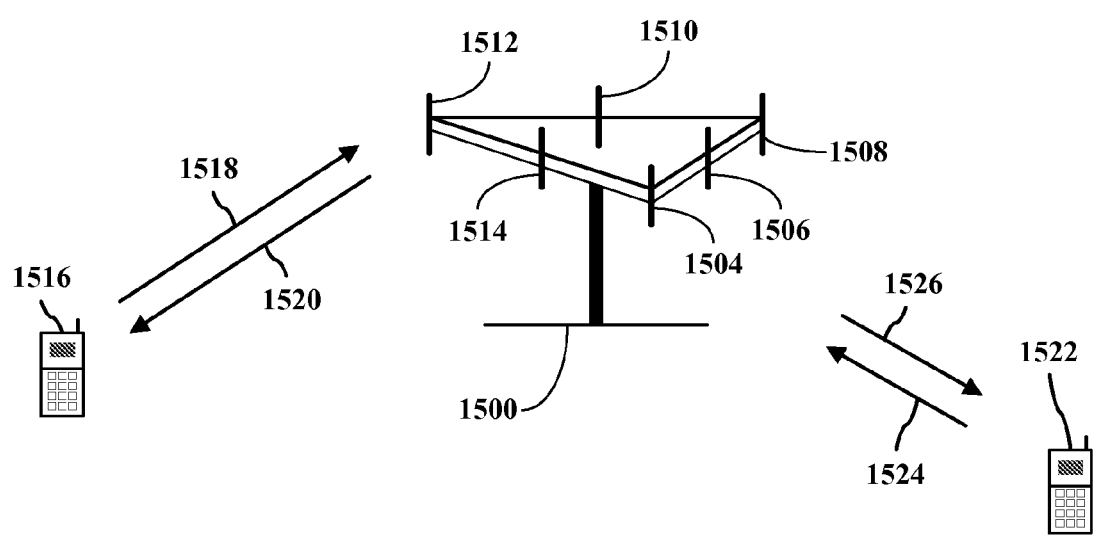
FIG. 15 illustrates an example wireless multiple-access communication system in accordance with various aspects set forth herein.

Referring now to FIG. 15, an illustration of a wireless multiple-access communication system is provided in accordance with various aspects. In one example, an access point 1500 (AP) includes multiple antenna groups. As illustrated in FIG. 15, one antenna group can include antennas 1504 and 1506, another can include antennas 1508 and 1510, and another can include antennas 1512 and 1514. While only two antennas are shown in FIG. 15 for each antenna group, it should be appreciated that more or fewer antennas may be utilized for each antenna group. In another example, an access terminal 1516 can be in communication with antennas 1512 and 1514, where antennas 1512 and 1514 transmit information to access terminal 1516 over forward link 1520 and receive information from access terminal 1516 over reverse link 1518. Additionally and/or alternatively, access terminal 1522 can be in communication with antennas 1506 and 1508, where antennas 1506 and 1508 transmit information to access terminal 1522 over forward link 1526 and receive information from access terminal 1522 over reverse link 1524. In a frequency division duplex system, communication links 1518, 1520, 1524 and 1526 can use different frequency for communication. For example, forward link 1520 may use a different frequency then that used by reverse link 1518.

Each group of antennas and/or the area in which they are designed to communicate can be referred to as a sector of the access point. In accordance with one aspect, antenna groups can be designed to communicate to access terminals in a sector of areas covered by access point 1500. In communication over forward links 1520 and 1526, the transmitting antennas of access point 1500 can utilize beamforming in order to improve the signal-to-noise ratio of forward links for the different access terminals 1516 and 1522. Also, an access point using beamforming to transmit to access terminals scattered randomly through its coverage causes less interference to access terminals in neighboring cells than an access point transmitting through a single antenna to all its access terminals.

An access point, e.g., access point 1500, can be a fixed station used for communicating with terminals and can also be referred to as a base station, an eNB, an access network, and/or other suitable terminology. In addition, an access terminal, e.g., an access terminal 1516 or 1522, can also be referred to as a mobile terminal, user equipment, a wireless communication device, a terminal, a wireless terminal, and/or other appropriate terminology.

Figure 16:
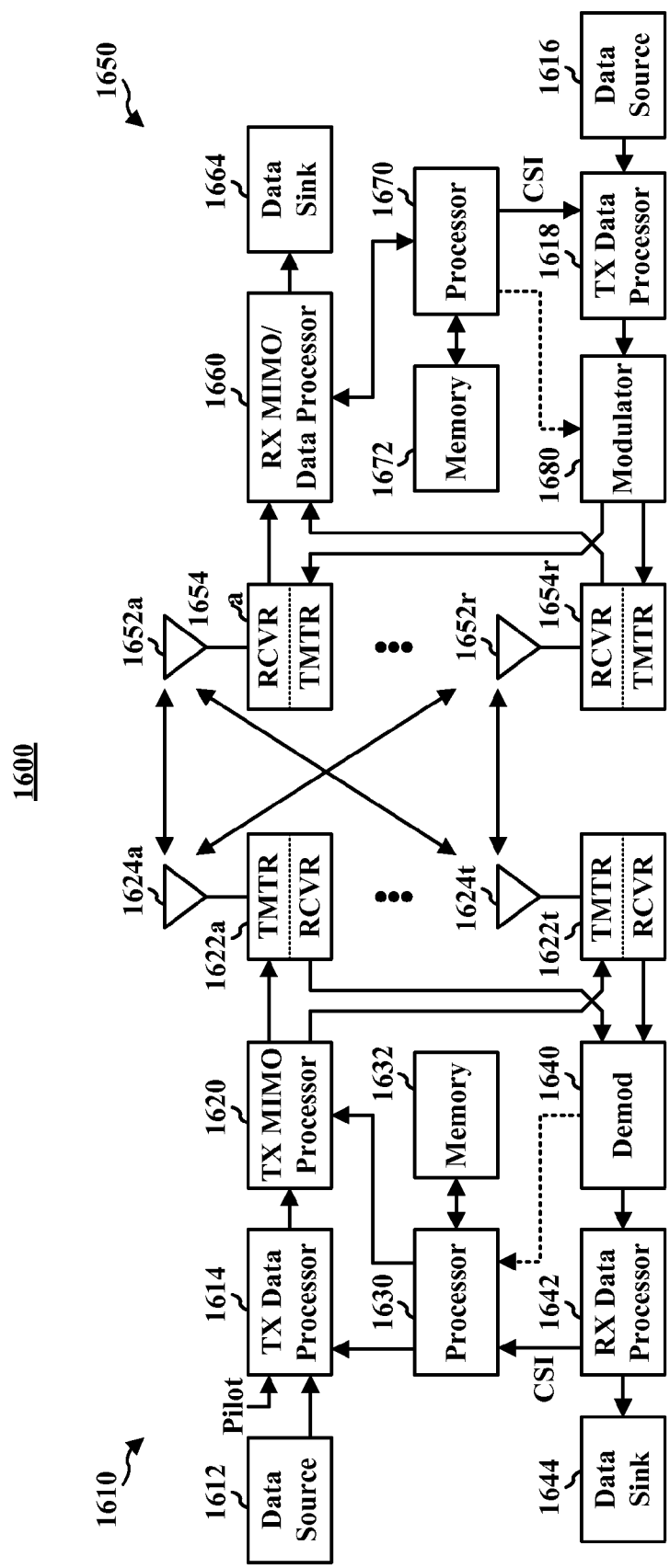
FIG. 16 is a block diagram illustrating an example wireless communications system in which various aspects described herein can function.

Referring now to FIG. 16, a block diagram illustrating an example wireless communications system 1600 in which various aspects described herein can function is provided. In one example, system 1600 is a multiple-input multiple-output (MIMO) system that includes a transmitter system 1610 and a receiver system 1650. It should be appreciated, however, that transmitter system 1610 and/or receiver system 1650 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1610 and/or receiver system 1650 described herein could be utilized in connection with a single output to single input antenna system.

In accordance with one aspect, traffic data for a number of data streams are provided at transmitter system 1610 from a data source 1612 to a transmit (TX) data processor 1614. In one example, each data stream can then be transmitted via a respective transmit antenna 1624. Additionally, TX data processor 1614 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1650 to estimate channel response. Back at transmitter system 1610, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1630.

Next, modulation symbols for all data streams can be provided to a TX MIMO processor 1620, which can further process the modulation symbols (e.g., for OFDM). TX MIMO processor 1620 can then provides $N_T$ modulation symbol streams to $N_T$ transceivers 1622a through 1622t. In one example, each transceiver 1622 can receive and process a respective symbol stream to provide one or more analog signals. Each transceiver 1622 can then further condition (e.g., amplify, filter, and upconvert) the analog signals to provide a modulated signal suitable for transmission over a MIMO channel. Accordingly, $N_T$ modulated signals from transceivers 1622a through 1622t can then be transmitted from $N_T$ antennas 1624a through 1624t, respectively.

In accordance with another aspect, the transmitted modulated signals can be received at receiver system 1650 by $N_R$ antennas 1652a through 1652r. The received signal from each antenna 1652 can then be provided to respective transceivers 1654. In one example, each transceiver 1654 can condition (e.g., filter, amplify, and downconvert) a respective received signal, digitize the conditioned signal to provide samples, and then processes the samples to provide a corresponding "received" symbol stream. An RX MIMO/data processor 1660 can then receive and process the $N_R$ received symbol streams from $N_R$ transceivers 1654 based on a particular receiver processing technique to provide $N_T$ "detected" symbol streams. In one example, each detected symbol stream can include symbols that are estimates of the modulation symbols transmitted for the corresponding data stream. RX MIMO/data processor 1660 can then process each symbol stream at least in part by demodulating, deinterleaving, and decoding each detected symbol stream to recover traffic data for a corresponding data stream. Thus, the processing by RX MIMO/data processor 1660 can be complementary to that performed by TX MIMO processor 1620 and TX data processor 1618 at transmitter system 1610. RX MIMO/data processor 1660 can additionally provide processed symbol streams to a data sink 1664.

In accordance with one aspect, the channel response estimate generated by RX MIMO/data processor 1660 can be used to perform space/time processing at the receiver, adjust power levels, change modulation rates or schemes, and/or other appropriate actions. Additionally, RX MIMO/data processor 1660 can further estimate channel characteristics such as, for example, signal-to-noise-and-interference ratios (SNRs) of the detected symbol streams. RX MIMO/data processor 1660 can then provide estimated channel characteristics to a processor 1670. In one example, RX MIMO/data processor 1660 and/or processor 1670 can further derive an estimate of the "operating" SNR for the system. Processor 1670 can then provide channel state information (CSI), which can comprise information regarding the communication link and/or the received data stream. This information can include, for example, the operating SNR. The CSI can then be processed by a TX data processor 1618, modulated by a modulator 1680, conditioned by transceivers 1654a through 1654r, and transmitted back to transmitter system 1610. In addition, a data source 1616 at receiver system 1650 can provide additional data to be processed by TX data processor 1618.

Back at transmitter system 1610, the modulated signals from receiver system 1650 can then be received by antennas 1624, conditioned by transceivers 1622, demodulated by a demodulator 1640, and processed by a RX data processor 1642 to recover the CSI reported by receiver system 1650. In one example, the reported CSI can then be provided to processor 1630 and used to determine data rates as well as coding and modulation schemes to be used for one or more data streams. The determined coding and modulation schemes can then be provided to transceivers 1622 for quantization and/or use in later transmissions to receiver system 1650. Additionally and/or alternatively, the reported CSI can be used by processor 1630 to generate various controls for TX data processor 1614 and TX MIMO processor 1620. In another example, CSI and/or other information processed by RX data processor 1642 can be provided to a data sink 1644.

In one example, processor 1630 at transmitter system 1610 and processor 1670 at receiver system 1650 direct operation at their respective systems. Additionally, memory 1632 at transmitter system 1610 and memory 1672 at receiver system 1650 can provide storage for program codes and data used by processors 1630 and 1670, respectively. Further, at receiver system 1650, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
  receiving a plurality of downlink resource grants related to a plurality of carriers for data transmission;
  obtaining a downlink assignment index (DAI) related to each of the plurality of downlink resource grants; and
  determining one or more lost downlink resource grants based at least in part on the DAI related to each of the plurality of downlink resource grants, wherein the determining one or more lost downlink resource grants includes:
  determining a total number of resource grants transmitted by an access point from the DAI; and
  performing one or more comparison operations based on a total number of the plurality of downlink resource grants and the total number of resource grants transmitted by the access point; and
  wherein the total number of resource grants refers to the total number of resource grants across the plurality of carriers in a given subframe or the total number of resource grants across the plurality of carriers and a plurality of subframes.

2. The method of claim 1, further comprising indicating a non-acknowledgement feedback parameter for the one or more lost downlink resource grants.

3. The method of claim 2, further comprising transmitting the non-acknowledgement feedback parameter with one or more additional feedback parameters to a device, wherein the plurality of downlink resource grants are received from the device.

4. The method of claim 3, wherein the transmitting the non-acknowledgement feedback parameter with the one or more additional feedback parameters includes indicating the non-acknowledgement feedback parameter and the one or more additional feedback parameters in bits represented by one or more cyclic shifts or orthogonal sequences utilized in transmitting related uplink communications to the device.

5. The method of claim 1, wherein the determining one or more lost downlink resource grants includes:
  determining a sequence number for each of the plurality of downlink resource grants from the DAI related to each of the plurality of downlink resource grants; and
  detecting an absent sequence number related to one or more lost downlink resource grants based at least in part on the sequence number for each of the plurality of downlink resource grants.

6. The method of claim 5, wherein the determining the sequence number for each of the plurality of downlink resource grants includes applying a mapping or a function based at least in part on the DAI related to each of the plurality of downlink resource grants.

7. The method of claim 5, wherein the sequence number for each of the plurality of downlink resource grants relates to a sequence of each downlink resource grant within the plurality of downlink resource grants across the plurality of carriers.

8. The method of claim 5, wherein the receiving the plurality of downlink resource grants includes receiving the plurality of downlink resource grants related to the plurality of carriers across the plurality of subframes.

9. The method of claim 8, wherein the sequence number for each of the plurality of downlink resource grants relates to a sequence of each downlink resource grant within the plurality of downlink resource grants with respect to each independent carrier of the plurality of carriers over the plurality of subframes.

10. The method of claim 8, wherein the sequence number for each of the plurality of downlink resource grants relates to a sequence of each downlink resource grant within the plurality of downlink resource grants across the plurality of carriers in each of the plurality of subframes.

11. The method of claim 5, wherein the determining one or more lost downlink resource grants further includes:
  determining a total number of resource grants transmitted by an access point from the DAI; and
  detecting the absent sequence number related to the one or more lost downlink resource grants based further in part on the total number of resource grants transmitted by the access point.

12. The method of claim 1, further comprising:
  transmitting an acknowledgment over a feedback resource related to a last downlink resource grant that indicates acknowledgment before a downlink resource grant that indicates a non-acknowledgment.

13. A wireless communications apparatus, comprising:
  at least one processor configured to:
    obtain a plurality of downlink resource grants related to a plurality of carriers;
    determine a downlink assignment index (DAI) related to at least one of the plurality of downlink resource grants; and
    detect one or more lost downlink resource grants based at least in part on the DAI by determining a total number of resource grants transmitted by an access point from the DAI; and
    performing one or more comparison operations based on a total number of the plurality of downlink resource grants and the total number of resource grants transmitted by the access point, wherein the total number of resource grants refers to the total number of resource grants across the plurality of carriers in a given subframe or the total number of resource grants across the plurality of carriers and a plurality of subframes; and
  a memory coupled to the at least one processor.

14. The wireless communications apparatus of claim 13, wherein the at least one processor is further configured to associate a non-acknowledgement feedback parameter with the one or more lost downlink resource grants.

15. The wireless communications apparatus of claim 14, wherein the at least one processor is further configured to transmit the non-acknowledgement feedback parameter with one or more additional feedback parameters to an access point.

16. The wireless communication apparatus of claim 13, wherein the at least one processor is further configured to transmit an acknowledgment over a feedback resource related to a last downlink resource grant that indicates acknowledgment before a downlink resource grant that indicates a non-acknowledgment.

17. An apparatus, comprising:
  means for receiving a plurality of downlink resource grants related to a plurality of carriers for data transmission; and
  means for detecting one or more lost downlink resource grants based at least in part on a downlink assignment index (DAI) for at least one of the plurality of downlink resource grants, wherein the means for detecting one or more lost downlink resource grants includes:
  means for determining a total number of resource grants transmitted by an access point from the DAI; and
  means for performing one or more comparison operations based on a total number of the plurality of downlink resource grants and the total number of resource grants transmitted by the access point; and
  wherein the total number of resource grants refers to the total number of resource grants across the plurality of carriers in a given subframe or the total number of resource grants across the plurality of carriers and a plurality of subframes.

18. The apparatus of claim 17, further comprising means for indicating a non-acknowledgement feedback parameter for the one or more lost downlink resource grants.

19. The apparatus of claim 18, wherein the means for indicating the non-acknowledgement feedback parameter includes means for transmitting the non-acknowledgement feedback parameter with one or more additional feedback parameters to an access point.

20. The apparatus of claim 17, further comprising:
  means for transmitting an acknowledgment over a feedback resource related to a last downlink resource grant that indicates acknowledgment before a downlink resource grant that indicates a non-acknowledgment.

21. A computer program product, comprising:
a computer-readable medium comprising:
code for causing at least one computer to obtain a plurality of downlink resource grants related to a plurality of carriers;
code for causing the at least one computer to determine a downlink assignment index (DAI) related to at least one of the plurality of downlink resource grants; and
code for causing the at least one computer to detect one or more lost downlink resource grants based at least in part on the DAI, wherein the code for causing the at least one computer to detect one or more lost downlink resource grants includes:
code for causing the at least one computer to determine a total number of resource grants transmitted by an access point from the DAI; and
code for causing the at least one computer to perform one or more comparison operations based on a total number of the plurality of downlink resource grants and the total number of resource grants transmitted by the access point; and
wherein the total number of resource grants refers to the total number of resource grants across the plurality of carriers in a given subframe or the total number of resource grants across the plurality of carriers and a plurality of subframes.

22. The computer program product of claim 21, wherein the computer-readable medium further comprises code for causing the at least one computer to associate a non-acknowledgement feedback parameter with the one or more lost downlink resource grants.

23. The computer program product of claim 22, wherein the computer-readable medium further comprises code for causing the at least one computer to transmit the non-acknowledgement feedback parameter with one or more additional feedback parameters to an access point.

24. The computer program product of claim 21, wherein the computer-readable medium further comprises code for causing the at least one computer to transmit an acknowledgment over a feedback resource related to a last downlink resource grant that indicates acknowledgment before a downlink resource grant that indicates a non-acknowledgment.

25. An apparatus, comprising:
a downlink grant receiving component configured to obtain a plurality of downlink resource grants related to a plurality of carriers for data transmission; and
a lost grant determining component configured to detect one or more lost downlink resource grants based at least in part on a downlink assignment index (DAI) for at least one of the plurality of downlink resource grants, wherein the lost grant determining component is further configured to:
determine a total number of resource grants transmitted by an access point from the DAI; and
perform one or more comparison operations based on a total number of the plurality of downlink resource grants and the total number of resource grants transmitted by the access point; and
wherein the total number of resource grants refers to the total number of resource grants across the plurality of carriers in a given subframe or the total number of resource grants across the plurality of carriers and a plurality of subframes.

26. The apparatus of claim 25, further comprising a hybrid automatic repeat/request (HARQ) indicating component configured to specify a non-acknowledgement feedback parameter for the one or more lost downlink resource grants.

27. The apparatus of claim 26, wherein the HARQ indicating component is further configured to transmit the non-acknowledgement feedback parameter with one or more additional feedback parameters to an access point.

28. The apparatus of claim 25, further comprising a transmit component configured to transmit an acknowledgment over a feedback resource related to a last downlink resource grant that indicates acknowledgment before a downlink resource grant that indicates a non-acknowledgment.

* * * * *